US 12,055,790 B2

(12) United States Patent
Chen et al.

(10) Patent No.: US 12,055,790 B2
(45) Date of Patent: Aug. 6, 2024

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 710 days.

(21) Appl. No.: 17/133,680

(22) Filed: Dec. 24, 2020

(65) Prior Publication Data

US 2022/0026672 A1  Jan. 27, 2022

(30) Foreign Application Priority Data

Jul. 27, 2020  (CN) .......................... 202010727540.5

(51) Int. Cl.
*G02B 9/64* (2006.01)
*G02B 13/18* (2006.01)

(52) U.S. Cl.
CPC ............... *G02B 9/64* (2013.01); *G02B 13/18* (2013.01)

(58) Field of Classification Search
CPC .......... G02B 9/64; G02B 13/06; G02B 13/18; G02B 13/0045; H04N 23/55
See application file for complete search history.

(56) References Cited

U.S. PATENT DOCUMENTS 7,382,547 B2 * 6/2008 Satori ............ G02B 15/144515
359/689
8,094,385 B2 * 1/2012 Sueyoshi ............... G02B 13/04
359/717

(Continued)

FOREIGN PATENT DOCUMENTS

CN       109143534 A   *  1/2019   ......... G02B 13/0045
CN       110609376 A   * 12/2019   ......... G02B 13/0015

(Continued)

OTHER PUBLICATIONS

Kevin P. Thompson et al., Freeform Optical Surfaces, OPN Optics & Photonic News, 2012, pp. 31-35 [online], [retrieved on Sep. 27, 2022], retrieved from the Internet <URL: http://centerfreeformoptics.org/wp-content/uploads/2015/01/Freeform-Optical-Surfaces-part1.pdf> . (Year: 2012) (Year: 2012).*

(Continued)

*Primary Examiner* — Cara E Rakowski
*Assistant Examiner* — Wesley Scott Ashton
(74) *Attorney, Agent, or Firm* — W&G Law Group

(57) ABSTRACT

A camera optical lens includes, from an object side to an image side, a first lens, a second lens, a third lens, a fourth lens, a fifth lens, a sixth lens, a seventh lens, and an eighth lens. At least one of the first lens to the eighth lens has a free-form surface, and the camera optical lens satisfies: $-7.50 \leq f2/f6 \leq -1.50$; and $-6.00 \leq R1/R2 \leq -0.18$, where f2 denotes a focal length of the second lens, f6 denotes a focal length of the sixth lens, R1 denotes a curvature radius of an object-side surface of the first lens, and R2 denotes a curvature radius of an image-side surface of the first lens. The camera optical lens has good optical performance, as well as a large aperture, ultra-thinness and a wide angle.

9 Claims, 8 Drawing Sheets

(56) References Cited

U.S. PATENT DOCUMENTS

| | | | | |
|---|---|---|---|---|
| 8,953,093 | B2* | 2/2015 | Katou | G02B 13/18 |
| | | | | 348/360 |
| 10,429,621 | B2* | 10/2019 | Jhang | G02B 13/0045 |
| 11,137,576 | B2* | 10/2021 | Kuo | G02B 9/64 |
| 11,262,540 | B2* | 3/2022 | Huang | G02B 13/0055 |
| 11,454,787 | B2* | 9/2022 | Wang | G02B 13/0045 |
| 11,531,191 | B2* | 12/2022 | Tseng | G02B 13/0045 |
| 11,579,406 | B2* | 2/2023 | Chen | G02B 9/64 |
| 11,774,718 | B2* | 10/2023 | Wang | G02B 9/64 |
| | | | | 359/761 |
| 11,914,223 | B2* | 2/2024 | Sun | G02B 13/18 |
| 2002/0176176 | A1* | 11/2002 | Shinohara | G02B 13/04 |
| | | | | 359/691 |
| 2016/0306141 | A1* | 10/2016 | Chen | G02B 13/0045 |
| 2018/0372998 | A1* | 12/2018 | Pao | G02B 13/0045 |
| 2019/0056568 | A1* | 2/2019 | Huang | G02B 9/64 |
| 2019/0204556 | A1* | 7/2019 | Jhang | G02B 13/0045 |
| 2020/0073092 | A1* | 3/2020 | Chen | G02B 13/18 |
| 2021/0096346 | A1* | 4/2021 | Matsumura | G03B 7/091 |
| 2021/0263281 | A1* | 8/2021 | Chen | G02B 13/06 |
| 2022/0026671 | A1* | 1/2022 | Sun | G02B 13/04 |
| 2022/0026673 | A1* | 1/2022 | Sun | G02B 13/0045 |
| 2022/0026674 | A1* | 1/2022 | Sun | G02B 13/06 |
| 2022/0026679 | A1* | 1/2022 | Sun | G02B 13/06 |
| 2022/0026680 | A1* | 1/2022 | Chen | G02B 9/64 |
| 2023/0087761 | A1* | 3/2023 | Sun | G02B 13/04 |
| | | | | 359/708 |

FOREIGN PATENT DOCUMENTS

| | | | | | |
|---|---|---|---|---|---|
| CN | 110873944 | A | * | 3/2020 | G02B 13/0045 |
| CN | 111025589 | A | * | 4/2020 | G02B 13/0045 |
| CN | 111596446 | A | * | 8/2020 | G02B 13/0045 |
| JP | 02-158706 | A | * | 6/1990 | G02B 13/0045 |
| TW | 202008024 | A | * | 2/2020 | |

OTHER PUBLICATIONS

Simon Thibault et al., Consumer Electronic Optics: How Small a Lens can be? The Case of Panomorph Lenses, 9192 Proceedings of SPIE 91920H-1 to 91920H-7 (2014). (Year: 2014).*

Focal Lengths, Apertures and F/Numbers, 2016, pp. 1-2 [online], [retrieved May 3, 2023], retrieved from the Internet <URL: https://spacemath.gsfc.nasa.gov/weekly/10Page30.pdf>. (Year: 2016).*

Jingfei Ye et al., Review of Optical Freeform Surface Representation Technique and Its Application, 56 Optical Engineering 110901-1 to 110901-15 (2017). (Year: 2017).*

Richard Juergens, Designing Optical Systems, 2018, pp. 1-60 [online], [retrieved May 23, 2023], retrieved from the Internet <URL: https://wp.optics.arizona.edu/jsasian/wp-content/uploads/sites/33/2018/11/RJ-2018-Opti-517-Designing-Optical-Systems.pdf>. (Year: 2018).*

Libin Sun et al., Lens Factory: Automatic Lens Generation Using Off-the-shelf Components, 2015, pp. 1-12 [online], [retrieved Aug. 22, 2023], retrieved from the Internet <URL: https://arxiv.org/pdf/1506.08956.pdf>. (Year: 2015).*

William Plummer, Some Milestones in the Design, Development, and Manufacture of Freeform Optics, 2019, pp. 1-15 [online], [retrieved Jun. 10, 2023], retrieved from Internet <URL: https://www.spiedigitallibrary.org/conference-proceedings-of-spie/10838/1083802/Some-milestones-in-the-design-development-a>. (Year: 2019).*

* cited by examiner

CAMERA OPTICAL LENS

TECHNICAL FIELD

The present disclosure relates to the field of optical lenses, and more particularly, to a camera optical lens suitable for handheld terminal devices such as smart phones and digital cameras, and suitable for camera devices such as monitors and PC lenses.

BACKGROUND

With development of the imaging lenses, higher and higher requirements are put forward for imaging of the lens. The "night scene photography" and "background blur" of the lens have also become important indicators to measure an imaging of the lens. The structures in the related art have insufficient refractive power distribution, lens spacing and lens shape settings, resulting in insufficient ultra-thinness and insufficient wide angle of the lenses. Moreover, a rotationally symmetric aspherical surface is mostly used, but such aspherical surface has a sufficient degree of freedom only in a meridian plane, and cannot correct aberration well. A free-form surface is a surface not rotationally symmetric, and can better balance aberration and improve imaging quality. Besides, the technology of processing for a free-form surface is gradually mature. Thus, with increasing requirements for lens imaging, it is very important to provide a free-form surface when designing a camera lens, especially in the design of a wide-angle and ultra-wide-angle lens.

SUMMARY

In view of the above-mentioned problems, a purpose of the present disclosure is to provide a camera optical lens, which has a large aperture, a wide angle, and ultra-thinness, as well as excellent optical performance.

An embodiment of the present disclosure provides a camera optical lens. The camera optical lens includes, from an object side to an image side, a first lens, a second lens, a third lens, a fourth lens, a fifth lens, a sixth lens, a seventh lens, and an eighth lens. At least one of the first lens, the second lens, the third lens, the fourth lens, the fifth lens, the sixth lens, the seventh lens, or the eighth lens has a free-form surface, and the camera optical lens satisfies:

$-7.50 \leq f2/f6 \leq -1.50$; and $-6.00 \leq R1/R2 \leq -0.18$, where f2 denotes a focal length of the second lens, f6 denotes a focal length of the sixth lens, R1 denotes a curvature radius of an object-side surface of the first lens, and R2 denotes a curvature radius of an image-side surface of the first lens.

As an improvement, the camera optical lens satisfies:

$4.00 \leq d5/d6 \leq 9.00$, where d5 denotes an on-axis thickness of the third lens, and d6 denotes an on-axis distance from an image-side surface of the third lens to an object-side surface of the fourth lens.

As an improvement, the camera optical lens satisfies:

$-4.14 \leq f1/f \leq -1.07$;

$-1.36 \leq (R1+R2)/(R1-R2) \leq 1.07$; and $0.03 \leq d1/TTL \leq 0.14$, where f denotes a focal length of the camera optical lens, f1 denotes a focal length of the first lens, d1 denotes an on-axis thickness of the first lens, and TTL denotes a total optical length from the object-side surface of the first lens to an image plane of the camera optical lens along an optic axis.

As an improvement, the camera optical lens satisfies:

$-28.38 \leq f2/f \leq 8.13$;

$-12.87 \leq (R3+R4)/(R3-R4) \leq 18.86$; and $0.02 \leq d3/TTL \leq 0.07$, where f denotes a focal length of the camera optical lens, R3 denotes a curvature radius of an object-side surface of the second lens, R4 denotes a curvature radius of an image-side surface of the second lens, d3 denotes an on-axis thickness of the second lens, and TTL denotes a total optical length from the object-side surface of the first lens to an image plane of the camera optical lens along an optic axis an optical length of the camera optical lens.

As an improvement, the camera optical lens satisfies:

$0.53 \leq f3/f \leq 10.57$;

$-6.72 \leq (R5+R6)/(R5-R6) \leq -0.10$; and $0.02 \leq d5/TTL \leq 0.12$, where f denotes a focal length of the camera optical lens, f3 denotes a focal length of the third lens, R5 denotes a curvature radius of an object-side surface of the third lens, R6 denotes a curvature radius of an image-side surface of the third lens, d5 denotes an on-axis thickness of the third lens, and TTL denotes a total optical length from the object-side surface of the first lens to an image plane of the camera optical lens along an optic axis.

As an improvement, the camera optical lens satisfies:

$0.65 \leq f4/f \leq 7.26$;

$0.14 \leq (R7+R8)/(R7-R8) \leq 6.79$; and $0.03 \leq d7/TTL \leq 0.15$, where f denotes a focal length of the camera optical lens, f4 denotes a focal length of the fourth lens, R7 denotes a curvature radius of an object-side surface of the fourth lens, R8 denotes a curvature radius of an image-side surface of the fourth lens, d7 denotes an on-axis thickness of the fourth lens, and TTL denotes a total optical length from the object-side surface of the first lens to an image plane of the camera optical lens along an optic axis.

As an improvement, the camera optical lens satisfies:

$-8.07 \leq f5/f \leq -1.92$;

$0.02 \leq (R9+R10)/(R9-R10) \leq 6.14$; and $0.02 \leq d9/TTL \leq 0.06$, where f denotes a focal length of the camera optical lens, f5 denotes a focal length of the fifth lens, R9 denotes a curvature radius of an object-side surface of the fifth lens, R10 denotes a curvature radius of an image-side surface of the fifth lens, d9 denotes an on-axis thickness of the fifth lens, and TTL denotes a total optical length from the object-side surface of the first lens to an image plane of the camera optical lens along an optic axis an optical length of the camera optical lens.

As an improvement, the camera optical lens satisfies:

$6.00 \le f6/f \le 2.97$;

$-1.17 \le (R11+R12)/(R11-R12) \le 0.60$; and $0.05 \le d11/TTL \le 0.16$, where f denotes a focal length of the camera optical lens, R11 denotes a curvature radius of an object-side surface of the sixth lens, and R12 denotes a curvature radius of an image-side surface of the sixth lens, d11 denotes an on-axis thickness of the sixth lens, and TTL denotes a total optical length from the object-side surface of the first lens to an image plane of the camera optical lens along an optic axis.

As an improvement, the camera optical lens satisfies:

$0.41 \le f7/f \le 1.99$;

$0.26 \le (R13+R14)/(R13-R14) \le 5.59$; and $0.04 \le d13/TTL \le 0.20$, where f denotes an focal length of the camera optical lens, f7 denotes a focal length of the seventh lens, R13 denotes a curvature radius of an object-side surface of the seventh lens, R14 denotes a curvature radius of an image-side surface of the seventh lens, d13 denotes an on-axis thickness of the seventh lens, and TTL denotes a total optical length from the object-side surface of the first lens to an image plane of the camera optical lens along an optic axis an optical length of the camera optical lens.

As an improvement, the camera optical lens satisfies:

$-2.74 \le f8/f \le -0.82$;

$1.15 \le (R15+R16)/(R15-R16) \le 4.00$; and $0.03 \le d15/TTL \le 0.16$, where f denotes a focal length of the camera optical lens, f8 denotes a focal length of the eighth lens, R15 denotes a curvature radius of an object-side surface of the eighth lens, R16 denotes a curvature radius of an image-side surface of the eighth lens, d15 denotes an on-axis thickness of the eighth lens, and TTL denotes a total optical length from the object-side surface of the first lens to an image plane of the camera optical lens along an optic axis an optical length of the camera optical lens.

The camera optical lens of the present disclosure has good optical performance, as well as a large aperture, ultra-thinness and a wide angle, and is suitable for mobile phone camera lens assembly and WEB camera lens composed of imaging elements for high pixel such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to better illustrate the purpose, technical solutions and advantages of the present disclosure, the embodiments of the present disclosure will be described in details as follows with reference to the accompanying drawings. However, it should be understood by those skilled in the art that, technical details are set forth in the embodiments of the present disclosure so as to better illustrate the present disclosure. However, the technical solutions claimed in the present disclosure can be achieved without these technical details and various changes and modifications based on the following embodiments.

Embodiment 1

Figure 1:
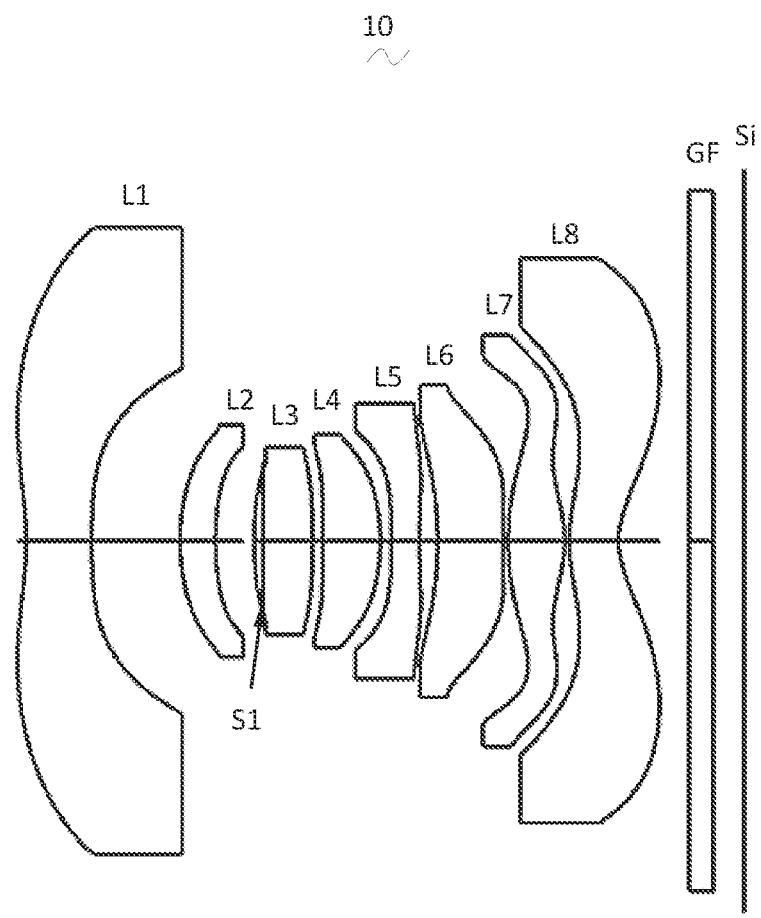
FIG. 1 is a schematic structural diagram of a camera optical lens according to Embodiment 1 of the present disclosure.

With reference to FIG. 1, the present disclosure provides a camera optical lens 10. FIG. 1 illustrates a camera optical lens 10 according to Embodiment 1 of the present disclosure. The camera optical lens 10 includes eight lenses. Specifically, the camera optical lens 10 includes, from an object side to an image side, a first lens L1, a second lens L2, an aperture S1, a third lens L3, a fourth lens L4, a fifth lens L5, a sixth lens L6, a seventh lens L7, and an eighth lens L8. Optical elements such as an optical filter GF can be provided between the eighth lens L8 and an image plane Si. As an example, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material. In other embodiments, each lens can be made of another material.

As an example, at least one of the first lens L1, the second lens L2, the third lens L3, the fourth lens L4, the fifth lens L5, the sixth lens L6, the seventh lens L7, or the eighth lens L8 includes a free-form surface, and the free-form surface contributes to correction of aberrations such as astigmatism, field curvature, and distortion in a wide-angle optical system, thereby improving the imaging quality.

The camera optical lens satisfies the following condition: $-7.50 \le f2/f6 \le -1.50$, where f2 denotes a focal length of the second lens L2, and f6 denotes a focal length of the sixth lens L6. This condition specifies a ratio of the focal length of the second lens L2 to the focal length of the sixth lens L6. With this condition, the imaging quality can be improved.

The camera optical lens satisfies the following condition: −6.00≤R1/R2≤−0.18, where R1 denotes a curvature radius of an object-side surface of the first lens L1, and R2 denotes a curvature radius of an image-side surface of the first lens L1. This condition specifies a shape of the first lens L1. With this condition, a degree of light deflection is reduced and the imaging quality can be improved.

As an example, the camera optical lens satisfies the following condition: 4.00≤d5/d6≤9.00, where d5 denotes an on-axis thickness of the third lens L3, and d6 denotes an on-axis distance from an image-side surface of the third lens L3 to an object-side surface of the fourth lens L4. With this condition, the field curvature of the system is balanced and the imaging quality is improved.

As an example, the first lens L1 has a negative refractive power and includes an object-side surface being concave in a paraxial region and an image-side surface being concave in the paraxial region.

As an example, the camera optical lens satisfies the following condition: −4.14≤f1/f≤−1.07 where f denotes a focal length of the camera optical lens 10, and f1 denotes a focal length of the first lens L1. This condition specifies a ratio of the focal length of the first lens L1 to the focal length f. With this condition, the first lens L1 has an appropriate negative refractive power, which can reduce aberration of the system and achieve ultra-thin and wide-angle lens. As an example, the camera optical lens satisfies the following condition: −2.59≤f1/f≤−1.34.

As an example, the camera optical lens satisfies the following condition: −1.36≤(R1+R2)/(R1−R2)≤1.07, where R1 denotes a curvature radius of an object-side surface of the first lens L1, and R2 denotes a curvature radius of an image-side surface of the first lens L1. By reasonably controlling a shape of the first lens L1, the first lens L1 can effectively correct spherical aberration of the system. As an example, the camera optical lens satisfies the following condition: −0.85≤(R1+R2)/(R1−R2)≤0.85.

As an example, the camera optical lens satisfies the following condition: 0.03≤d1/TTL≤0.14, where d1 denotes an on-axis thickness of the first lens L1, and TTL denotes a total optical length from the object-side surface of the first lens to an image plane of the camera optical lens 10 along an optic axis. With this condition, it is beneficial to achieving ultra-thinness. As an example, the camera optical lens satisfies the following condition: 0.05≤d1/TTL≤0.11.

As an example, the second lens L2 has a positive refractive power and includes an object-side surface being convex in a paraxial region and an image-side surface being concave in the paraxial region.

As an example, the camera optical lens satisfies the following condition: −28.38≤f2/f≤8.13, where f denotes a focal length of the camera optical lens 10, and f2 denotes a focal length of the second lens. By controlling the focal power of the second lens L2 within a reasonable range, it is beneficial to correcting aberration of the optical system. As an example, the camera optical lens satisfies the following condition: −17.74≤f2/f≤6.50.

As an example, the camera optical lens satisfies the following condition: −12.87≤(R3+R4)/(R3−R4)≤18.86, where R3 denotes a curvature radius of an object-side surface of the second lens L2, and R4 denotes a curvature radius of an image-side surface of the second lens L2. This condition specifies a shape of the second lens L2. With this condition and the development of ultra-thinness and wide-angle lenses, it is beneficial to correcting longitudinal aberration. As an example, the camera optical lens satisfies the following condition: −8.04≤(R3+R4)/(R3−R4)≤15.09.

As an example, the camera optical lens satisfies the following condition: 0.02≤d3/TTL≤0.07, where d3 denotes an on-axis thickness of the second lens, and TTL denotes a total optical length from the object-side surface of the first lens to an image plane of the camera optical lens along an optic axis. With this condition, it is beneficial to achieving ultra-thinness. As an example, the camera optical lens satisfies the following condition: 0.03≤d3/TTL≤0.06.

As an example, the third lens L3 has a positive refractive power and includes an object-side surface being convex in a paraxial region and an image-side surface being convex in the paraxial region.

As an example, the camera optical lens satisfies the following condition: 0.53≤f3/f≤10.57. Reasonable distribution of focal power enables the system to have better imaging quality and lower sensitivity. As an example, the camera optical lens satisfies the following condition: 0.84≤f3/f≤8.46.

As an example, the camera optical lens satisfies the following condition: −6.72≤(R5+R6)/(R5−R6)≤−0.10, where R5 denotes a curvature radius of an object-side surface of the third lens L3, and R6 denotes a curvature radius of an image-side surface of the third lens L3. This condition specifies a shape of the third lens L3. With the condition, it is beneficial to alleviating a degree of deflection of light passing through the lens and effectively reducing aberration. As an example, the camera optical lens satisfies the following condition: −4.20≤(R5+R6)/(R5−R6)≤−0.12.

As an example, the camera optical lens satisfies the following condition: 0.02≤d5/TTL≤0.12, where d5 denotes an on-axis thickness of the third lens, and TTL denotes a total optical length from the object-side surface of the first lens to an image plane of the camera optical lens along an optic axis. With this condition, it is beneficial to achieving ultra-thinness. As an example, the camera optical lens satisfies the following condition: 0.04≤d5/TTL≤0.10.

As an example, the fourth lens L4 has a positive refractive power and includes an object-side surface being concave in a paraxial region and an image-side surface being convex in the paraxial region.

As an example, the camera optical lens satisfies the following condition: 0.65≤f4/f≤7.26, where f denotes a focal length of the camera optical lens 10, and f4 denotes a focal length of the fourth lens L4. This condition specifies a ratio of the focal length of the fourth lens L4 to the focal length of the system. With this condition, the performance of the optical system can be improved. As an example, the camera optical lens satisfies the following condition: 1.04≤f4/f≤5.80.

As an example, the camera optical lens satisfies the following condition: 0.14≤(R7+R8)/(R7−R8)≤6.79, where R7 denotes a curvature radius of an object-side surface of the fourth lens L4, and R8 denotes a curvature radius of an image-side surface of the fourth lens L4. This condition specifies a shape of the fourth lens L4. With this condition and the development of ultra-thin and wide-angle lenses, it is beneficial to correcting aberration of an off-axis angle. As an example, the camera optical lens satisfies the following condition: 0.23≤(R7+R8)/(R7−R8)≤5.43.

As an example, the camera optical lens satisfies the following condition: 0.03≤d7/TTL≤0.15. With this condition, it is beneficial to achieving ultra-thinness. As an example, the camera optical lens satisfies the following condition: 0.05≤d7/TTL≤0.12.

As an example, the fifth lens L5 has a negative refractive power and includes an object-side surface being concave in a paraxial region and an image-side surface being convex in the paraxial region.

As an example, the camera optical lens satisfies the following condition: $-8.07 \leq f5/f \leq -1.92$, where f denotes a focal length of the camera optical lens 10, and f5 denotes a focal length of the fifth lens L5. The limitation on the fifth lens L5 can effectively smooth a light angle of the camera lens, and reduce tolerance sensitivity. As an example, the camera optical lens satisfies the following condition: $-5.05 \leq f5/f \leq -2.40$.

As an example, the camera optical lens satisfies the following condition: $0.02 \leq (R9+R10)/(R9-R10) \leq 6.14$, where R9 denotes a curvature radius of an object-side surface of the fifth lens, and R10 denotes a curvature radius of an image-side surface of the fifth lens. This condition specifies a shape of the fifth lens L5. With this condition and development of ultra-thin and wide-angle lenses, it is beneficial to correcting aberration of an off-axis angle. As an example, the camera optical lens satisfies the following condition: $0.03 \leq (R9+R10)/(R9-R10) \leq 4.92$.

As an example, the camera optical lens satisfies the following condition: $0.02 \leq d9/TTL \leq 0.06$, where d9 denotes an on-axis thickness of the fifth lens, and TTL denotes a total optical length from the object-side surface of the first lens to an image plane of the camera optical lens along an optic axis. With this condition, it is beneficial to achieving ultra-thinness. As an example, the camera optical lens satisfies the following condition: $0.03 \leq d9/TTL \leq 0.05$.

As an example, the sixth lens L6 has a negative refractive power and includes an object-side surface being concave in a paraxial region and an image-side surface being convex in the paraxial region.

As an example, the camera optical lens satisfies the following condition: $-6.00 \leq f6/f \leq 2.97$, where f denotes a focal length of the camera optical lens 10 and f6 denotes a focal length of the sixth lens L6. Reasonable distribution of focal power enables the system to have better imaging quality and lower sensitivity. As an example, the camera optical lens satisfies the following condition: $-3.75 \leq f6/f \leq 2.37$.

As an example, the camera optical lens satisfies the following condition: $-1.17 \leq (R11+R12)/(R11-R12) \leq 0.60$, where R11 denotes a curvature radius of an object-side surface of the sixth lens, R12 denotes a curvature radius of an image-side surface of the sixth lens. This condition defines a shape of the sixth lens L6. With this condition and the development of ultra-thin and wide-angle lenses, it is beneficial to correcting aberration of an off-axis angle. As an example, the camera optical lens satisfies the following condition: $-0.73 \leq (R11+R12)/(R11-R12) \leq 0.48$.

As an example, the camera optical lens satisfies the following condition: $0.05 \leq d11/TTL \leq 0.16$, where d11 denotes an on-axis thickness of the sixth lens L6, and TTL denotes a total optical length from the object-side surface of the first lens to an image plane of the camera optical lens 10 along an optic axis. With this condition, it is beneficial to achieving ultra-thinness. As an example, the camera optical lens satisfies the following condition: $0.07 \leq d11/TTL \leq 0.13$.

As an example, the seventh lens L7 has a positive refractive power and includes an object-side surface being convex in a paraxial region and an image-side surface being convex in the paraxial region.

As an example, the camera optical lens satisfies the following condition: $0.41 \leq f7/f \leq 1.99$, where f denotes a focal length of the camera optical lens, and f7 denotes a focal length of the seventh lens. Reasonable distribution of focal power enables the system to have better imaging quality and lower sensitivity. As an example, the camera optical lens satisfies the following condition: $0.66 \leq f7/f \leq 1.59$.

As an example, the camera optical lens satisfies the following condition: $0.26 \leq (R13+R14)/(R13-R14) \leq 5.59$, where R13 denotes a curvature radius of an object-side surface of the seventh lens, and R14 denotes a curvature radius of an image-side surface of the seventh lens. This condition specifies a shape of the seventh lens L7. With this condition and the development of ultra-thin and wide-angle lenses, it is beneficial to correcting aberration of an off-axis angle. As an example, the camera optical lens satisfies the following condition: $0.41 \leq (R13+R14)/(R13-R14) \leq 4.47$.

As an example, the camera optical lens satisfies the following condition: $0.04 \leq d13/TTL \leq 0.20$, where d13 denotes an on-axis thickness of the seventh lens, and TTL denotes a total optical length from the object-side surface of the first lens to an image plane of the camera optical lens along an optic axis. With this condition, it is beneficial to achieving ultra-thinness. As an example, the camera optical lens satisfies the following condition: $0.06 \leq d13/TTL \leq 0.16$.

As an example, the eighth lens L8 has a negative refractive power and includes an object-side surface being convex in a paraxial region and an image-side surface being concave in the paraxial region.

As an example, the camera optical lens satisfies the following condition: $-2.74 \leq f8/f \leq -0.82$, where f denotes a focal length of the camera optical lens, and f8 denotes a focal length of the eighth lens. Reasonable distribution of refractive power enables the system to have better imaging quality and lower sensitivity. As an example, the camera optical lens satisfies the following condition: $-1.71 \leq f8/f \leq -1.02$.

As an example, the camera optical lens satisfies the following condition: $1.15 \leq (R15+R16)/(R15-R16) \leq 4.00$, where R15 denotes a curvature radius of an object-side surface of the eighth lens, and R16 denotes a curvature radius of an image-side surface of the eighth lens. This condition specifies a shape of the eighth lens. With this condition and the development of ultra-thinness and wide-angle lenses, it is beneficial to correcting aberration of an off-axis angle. As an example, the camera optical lens satisfies the following condition: $1.84 \leq (R15+R16)/(R15-R16) \leq 3.20$.

As an example, the camera optical lens satisfies the following condition: $0.03 \leq d15/TTL \leq 0.16$, where d15 denotes an on-axis thickness of the eighth lens, and TTL denotes a total optical length from the object-side surface of the first lens to an image plane of the camera optical lens along an optic axis. With this condition, it is beneficial to achieving ultra-thinness. As an example, the camera optical lens satisfies the following condition: $0.05 \leq d15/TTL \leq 0.13$.

As an example, an F value (FNO) of the camera optical lens 10 is smaller than or equal to 2.06, which can reach a large aperture and excellent imaging performance. As an example, FNO is smaller than or equal to 2.02.

As an example, a ratio of the optical length TTL of the camera optical lens to the full FOV image height IH (in a diagonal direction), i.e., TTL/IH, is smaller than or equal to 2.07, which is beneficial to achieving ultra-thinness. The FOV in the diagonal direction is larger than or equal to 119°, which is beneficial to achieving a wide angle.

As an example, the optical length TTL of the camera optical lens 10 is smaller than or equal to 6.82 mm, which is beneficial to achieving ultra-thinness. As an example, the optical length TTL is smaller than or equal to 6.51 mm.

When the above-mentioned condition is satisfied, the camera optical lens 10 has good optical performance, and when the free-form surface is adopted, the designed image plane area can be matched with an actual use area, thereby improving the image quality of the effective area to the greatest extent; and according to the characteristics of the camera optical lens 10, the camera optical lens 10 is suitable for a mobile phone camera lens assembly and a WEB camera lens composed of imaging elements for high pixels such as CCD and CMOS.

The camera optical lens 10 of the present disclosure will be described in the following by examples. The reference signs described in each example are as follows. The unit of the focal length, the on-axis distance, the curvature radius, and the on-axis thickness is mm.

TTL: the optical length (an on-axis distance from the object-side surface of the first lens L1 to the image plane), in a unit of mm.

FNO: a ratio of an effective focal length of the camera optical lens to an entrance pupil diameter.

Table 1 and Table 2 show design data of the camera optical lens 10 according to the Embodiment 1 of the present disclosure. Herein, the object-side surface and image-side surface of the eighth lens L8 are free-form surfaces.

TABLE 1

| | R | | d | nd | | vd |
|---|---|---|---|---|---|---|
| S1 | ∞ | d0= | −2.035 | | | |
| R1 | −2.451 | d1= | 0.562 | nd1 | 1.5444 | v1 | 56.43 |
| R2 | 12.925 | d2= | 0.761 | | | |
| R3 | 2.032 | d3= | 0.302 | nd2 | 1.6610 | v2 | 20.53 |
| R4 | 2.780 | d4= | 0.332 | | | |
| R5 | 2.727 | d5= | 0.502 | nd3 | 1.5444 | v3 | 56.43 |
| R6 | −11.680 | d6= | 0.087 | | | |
| R7 | −705.655 | d7= | 0.496 | nd4 | 1.5444 | v4 | 56.43 |
| R8 | −1.725 | d8= | 0.094 | | | |
| R9 | −11.081 | d9= | 0.240 | nd5 | 1.6800 | v5 | 18.40 |
| R10 | 5.296 | d10= | 0.157 | | | |
| R11 | −3.286 | d11= | 0.563 | nd6 | 1.5444 | v6 | 56.43 |
| R12 | 12.510 | d12= | 0.045 | | | |
| R13 | 3.280 | d13= | 0.484 | nd7 | 1.5444 | v7 | 56.43 |
| R14 | −1.020 | d14= | 0.040 | | | |
| R15 | 1.622 | d15= | 0.422 | nd8 | 1.6032 | v8 | 28.29 |
| R16 | 0.664 | d16= | 0.600 | | | |
| R17 | ∞ | d17= | 0.210 | ndg | 1.5168 | vg | 64.17 |
| R18 | ∞ | d18= | 0.267 | | | |

Herein, the representation of each reference sign is as follows.

S1: aperture;
R: curvature radius at a center of an optical surface;
R1: curvature radius of an object-side surface of a first lens L1;
R2: curvature radius of an image-side surface of the first lens L1;
R3: curvature radius of an object-side surface of a second lens L2;
R4: curvature radius of an image-side surface of the second lens L2;
R5: curvature radius of an object-side surface of a third lens L3;
R6: curvature radius of an image-side surface of the third lens L3;
R7: curvature radius of an object-side surface of a fourth lens L4;
R8: curvature radius of an image-side surface of the fourth lens L4;
R9: curvature radius of an object-side surface of a fifth lens L5;
R10: curvature radius of an image-side surface of the fifth lens L5;
R11: curvature radius of an object-side surface of a sixth lens L6;
R12: curvature radius of an image-side surface of the sixth lens L6;
R13: curvature radius of an object-side surface of a seventh lens L7;
R14: curvature radius of an image-side surface of the seventh lens L7;
R15: curvature radius of an object-side surface of an eighth lens L8;
R16: curvature radius of an image-side surface of the eighth lens L8;
R17: curvature radius of an object-side surface of an optical filter GF;
R18: curvature radius of an image-side surface of the optical filter GF;
d: on-axis thickness of the lens, and on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the optical filter GF;
d17: on-axis thickness of optical filter GF;
d18: on-axis distance from the image-side surface of the optical filter GF to the image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8; and
vg: abbe number of the optical filter GF.

Table 2 shows aspherical data of each lens in the camera optical lens 10 according to the Embodiment 1 of the present disclosure.

TABLE 2

| | Conic coefficient | Aspherical coefficient | | | | |
|---|---|---|---|---|---|---|
| | k | A4 | A6 | A8 | A10 | A12 |
| R1 | −2.1735E+01 | 8.7919E−02 | −4.6917E−02 | 2.0514E−02 | −6.6389E−03 | 1.5286E−03 |
| R2 | −9.7627E+00 | 2.8125E−01 | −2.5352E−01 | 3.1294E−01 | −3.4717E−01 | 3.0653E−01 |
| R3 | −6.8027E−01 | 7.5412E−02 | 1.5424E−01 | −9.1125E−01 | 3.6275E+00 | −7.9100E+00 |
| R4 | 8.5687E+00 | 1.1697E−01 | −1.6126E−01 | 1.3011E+00 | −3.6367E+00 | 5.6310E+00 |
| R5 | −1.7451E+00 | 4.0933E−02 | 5.3046E−02 | −1.2770E−01 | 2.7512E−01 | −2.6487E−01 |
| R6 | 8.2783E+00 | −1.3991E−01 | −1.4861E−01 | 4.2741E−01 | −6.8194E−01 | 1.2217E+00 |
| R7 | −7.4500E+00 | −1.3417E−01 | −3.8861E−02 | −8.1326E−01 | 3.1440E+00 | −5.0951E+00 |
| R8 | 9.5296E−01 | −2.6658E−02 | −3.2829E−01 | 8.1228E−01 | −1.9573E+00 | 3.7530E+00 |
| R9 | 7.2732E+00 | −2.7722E−01 | −4.0999E−01 | 1.5422E+00 | −5.0185E+00 | 1.0913E+01 |
| R10 | −1.0000E+01 | −1.6587E−01 | −1.5286E−01 | 7.5505E−01 | −1.7545E+00 | 2.5664E+00 |
| R11 | −7.3541E+00 | −2.1559E−02 | −2.6282E−01 | 1.3271E+00 | −3.1841E+00 | 4.2540E+00 |
| R12 | −4.4258E+00 | 2.6897E−02 | −1.7878E+00 | 3.7085E+00 | −3.9391E+00 | 2.2581E+00 |
| R13 | 2.2279E+00 | 4.1058E−01 | −1.4407E+00 | 2.6511E+00 | −3.0221E+00 | 2.0678E+00 |
| R14 | −6.9072E−01 | 8.3778E−01 | −6.7989E−01 | 8.6379E−01 | −1.2414E+00 | 1.1112E+00 |

| | Conic coefficient | Aspherical coefficient | | | |
|---|---|---|---|---|---|
| | k | A14 | A16 | A18 | A20 |
| R1 | −2.1735E+01 | −2.4061E−04 | 2.4519E−05 | −1.4552E−06 | 3.8258E−08 |
| R2 | −9.7627E+00 | −1.9074E−01 | 7.6555E−02 | −1.7476E−02 | 1.6955E−03 |
| R3 | −6.8027E−01 | 9.8680E+00 | −6.5357E+00 | 1.7238E+00 | 0.0000E+00 |
| R4 | 8.5687E+00 | −3.3713E+00 | −3.8162E−01 | 0.0000E+00 | 0.0000E+00 |
| R5 | −1.7451E+00 | 0.0000E+00 | 0.0000E+00 | 0.0000E+00 | 0.0000E+00 |
| R6 | 8.2783E+00 | −8.8214E−01 | 0.0000E+00 | 0.0000E+00 | 0.0000E+00 |
| R7 | −7.4500E+00 | 4.4154E+00 | −1.5676E+00 | 0.0000E+00 | 0.0000E+00 |
| R8 | 9.5296E−01 | −4.0478E+00 | 1.8943E+00 | −1.0309E−01 | 0.0000E+00 |
| R9 | 7.2732E+00 | −1.3087E+01 | 7.6560E+00 | −1.6415E+00 | 0.0000E+00 |
| R10 | −1.0000E+01 | −2.0862E+00 | 8.6127E+00 | −1.4160E+00 | 0.0000E+00 |
| R11 | −7.3541E+00 | −3.1280E+00 | 1.1897E+00 | −1.8366E−01 | 0.0000E+00 |
| R12 | −4.4258E+00 | −4.0908E−01 | −2.8785E−01 | 1.8567E−01 | −3.2422E−02 |
| R13 | 2.2279E+00 | −8.2788E−01 | 1.7416E−01 | −1.3021E−02 | −5.0648E−04 |
| R14 | −6.9072E−01 | −5.8802E−01 | 1.8231E−01 | −3.0683E−02 | 2.1676E−03 |

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1),$$

where k represents a Conic coefficient, A4, A6, A8, A10, A12, A14, A16, A18, and A20 represent aspherical coefficients, c represents the curvature at the center of the optical surface, r represents a vertical distance between a point on an aspherical curve and the optical axis, and Z represents an aspherical depth (a vertical distance between a point on an aspherical surface, having a distance of r from the optic axis, and a surface tangent to a vertex of the aspherical surface on the optic axis).

For convenience, the aspherical surface of each lens adopts the aspherical surface shown in the above equation (1). However, the present disclosure is not limited to the aspherical surface defined by the polynomial form expressed by the equation (1).

Table 3 shows free-form surface data in the camera optical lens 10 according to the Embodiment 1 of the present disclosure.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R15 | −1.4107E+00 | −2.1545E−01 | −4.3232E−01 | −2.1485E−01 | −3.8388E−01 | −1.1519E+00 | −1.1500E+00 | −3.8415E−01 |
| R16 | −3.5724E+00 | −2.0298E−01 | −4.0660E−01 | −2.0184E−01 | 1.3092E−01 | 3.9213E−01 | 3.9331E−01 | 1.3056E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R15 | 9.0693E−01 | 3.6281E+00 | 5.4419E+00 | 3.6277E+00 | 9.0669E−01 | −8.9063E−01 | −4.4531E+00 | −8.9066E+00 |
| R16 | −4.9166E−02 | −1.9653E−01 | −2.9479E−01 | −1.9668E−01 | −4.9302E−02 | 5.0563E−03 | 2.5342E−02 | 5.0543E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R15 | −8.9069E+00 | −4.4537E+00 | −8.9054E−01 | 5.0225E−01 | 3.0136E+00 | 7.5338E+00 | 1.0045E+01 | 7.5338E+00 |
| R16 | 5.0627E−02 | 2.5237E−02 | 5.1232E−03 | 3.5508E−03 | 2.1300E−02 | 5.3233E−02 | 7.1001E−02 | 5.3247E−02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R15 | 3.0134E+00 | 5.0220E−01 | −1.7475E−01 | −1.2233E+00 | −3.6700E+00 | −6.1164E+00 | −6.1163E+00 | −3.6696E+00 |
| R16 | 2.1309E−02 | 3.5473E−03 | −1.6824E−03 | −1.1777E−02 | −3.5335E−02 | −5.8882E−02 | −5.8883E−02 | −3.5332E−02 |

TABLE 3-continued

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R15 | −1.2231E+00 | −1.7470E−01 | 3.7495E−02 | 2.9997E−01 | 1.0498E+00 | 2.0997E+00 | 2.6246E+00 | 2.0998E+00 |
| R16 | −1.1769E−02 | −1.6834E−03 | 3.2755E−04 | 2.6200E−03 | 9.1700E−03 | 1.8341E−02 | 2.2926E−02 | 1.8344E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R15 | 1.0499E+00 | 3.0000E−01 | 3.7507E−02 | −4.6006E−03 | −4.1405E−02 | −1.6561E−01 | −3.8639E−01 | −5.7966E−01 |
| R16 | 9.1710E−03 | 2.6239E−03 | 3.2929E−04 | −3.1395E−05 | −2.8251E−04 | −1.1298E−03 | −2.6361E−03 | −3.9545E−03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R15 | −5.7967E−01 | −3.8638E−01 | −1.6561E−01 | −4.1349E−02 | −4.6174E−03 | 2.4909E−04 | 2.4899E−03 | 1.1210E−02 |
| R16 | −3.9542E−03 | −2.6363E−03 | −1.1292E−03 | −2.8188E−04 | −3.1981E−05 | 1.2152E−06 | 1.2152E−05 | 5.4685E−05 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R15 | 2.9899E−02 | 5.2307E−02 | 6.2765E−02 | 5.2286E−02 | 2.9852E−02 | 1.1130E−02 | 2.4566E−03 | 2.5191E−04 |
| R16 | 1.4589E−04 | 2.5506E−04 | 3.0598E−04 | 2.5529E−04 | 1.4516E−04 | 5.4330E−05 | 1.1445E−05 | 1.2601E−06 |

$$z = \frac{cr^2}{1+\sqrt{1-(1+k)c^2r^2}} + \sum_{i=1}^{N} B_i E_i(x, y), \quad (2)$$

where k represents a conic coefficient, Bi represents a free-form surface coefficient, c represents the curvature at the center of the optical surface, r represents a vertical distance between the a point on the free-form surface and the optical axis, x represents the x-direction component of r, y represents the y-direction component of r, and z represents aspherical depth (a vertical distance between a point on an aspherical surface, having a distance of r from the optic axis, and a surface tangent to a vertex of the aspherical surface on the optic axis).

For convenience, each free-form surface uses an extended polynomial surface shown in the above formula (2). However, the present disclosure is not limited to the free-form surface polynomial form expressed by the formula (2).

Figure 2:
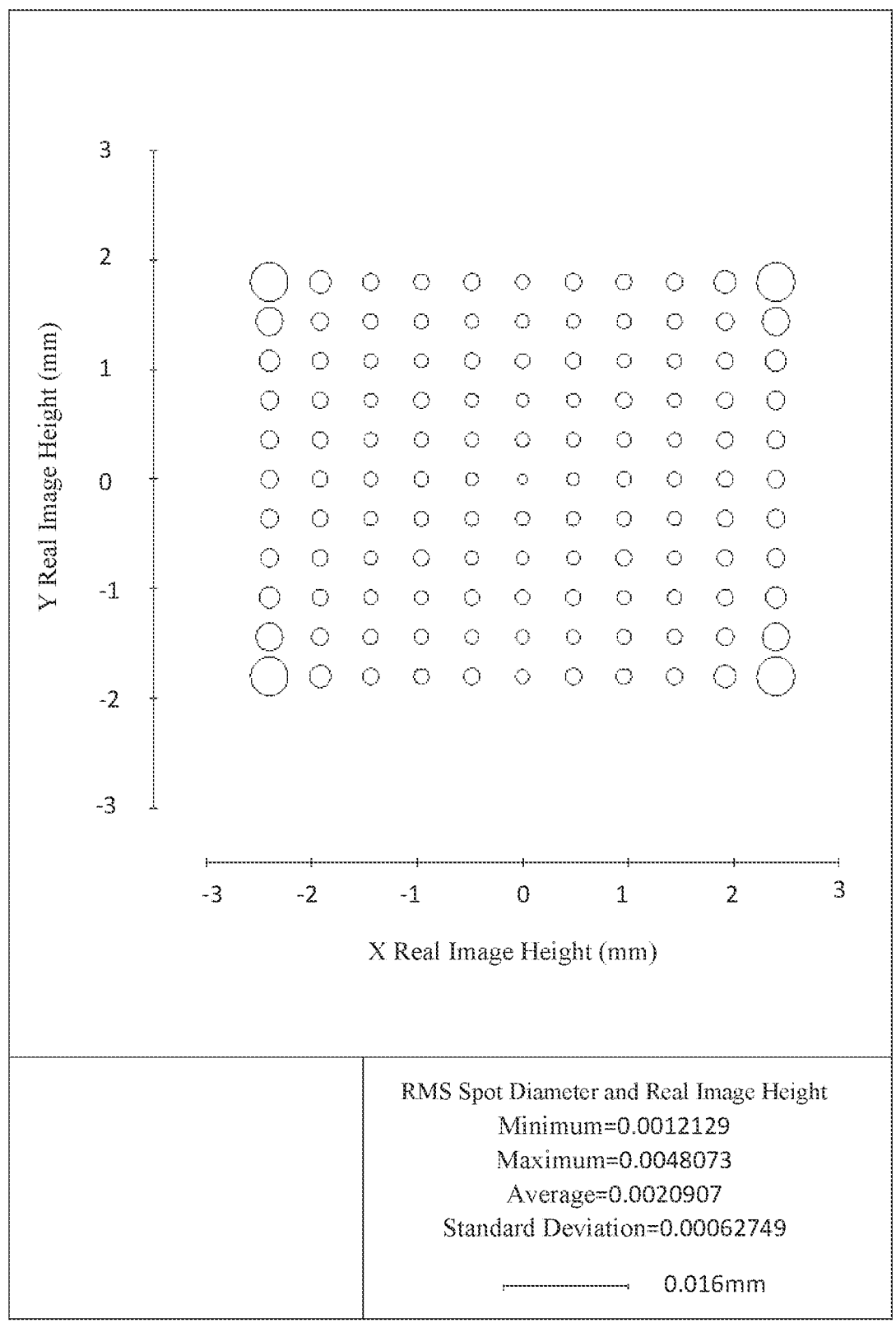
FIG. 2 illustrates a situation where RMS spot diameter of the camera optical lens shown in FIG. 1 is located in a first quadrant.
Figure 3:
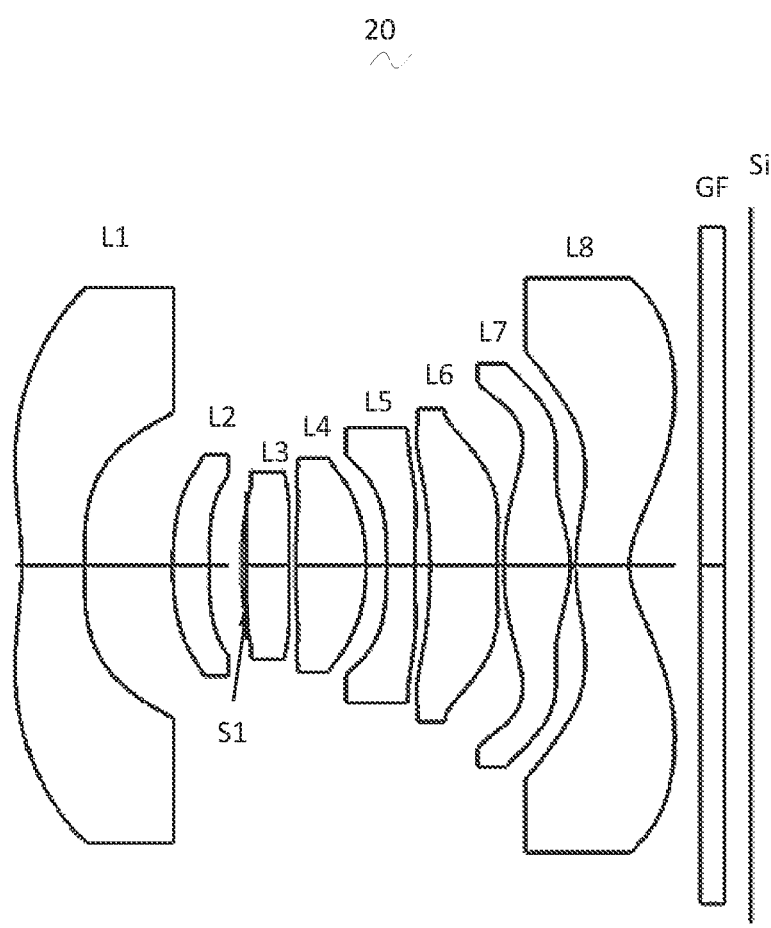
FIG. 3 is a schematic structural diagram of a camera optical lens according to Embodiment 2 of the present disclosure.

FIG. 2 shows a situation where the RMS spot diameter of the camera optical lens 10 according to Embodiment 1 is located in a first quadrant. According to FIG. 2, it can be seen that the camera optical lens 10 according to the Embodiment 1 can achieve good imaging quality.

The following Table 13 shows numerical values in each of the embodiments 1-4, and the parameters already specified in the condition.

As shown in Table 13, Embodiment 1 satisfies respective condition.

As an example, an entrance pupil diameter ENPD of the camera optical lens 10 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 119.99°, the FOV in the x direction is 107.00°, and the FOV in the y direction is 89.94°. The camera optical lens 10 satisfies the design requirements of a wide angle and ultra-thinness, and its on-axis and off-axis color aberration is sufficiently corrected, and the camera optical lens 10 has excellent optical characteristics.

Embodiment 2

The Embodiment 2 is basically the same as the Embodiment 1, and the reference signs in the Embodiment 2 are the same as those in the Embodiment 1, and only a difference thereof will be described in the following.

As an example, the image-side surface of the third lens L3 is concave in the paraxial region, and the object-side surface of the fourth lens L4 is convex in the paraxial region.

Table 4 and Table 5 show design data of the camera optical lens 20 according to the Embodiment 2 of the present disclosure. Herein, the object-side surface and the image-side surface of the seventh lens L7 are free-form surfaces.

TABLE 4

| | R | d | | nd | | vd | |
|---|---|---|---|---|---|---|---|
| S1 | ∞ | d0= | −1.908 | | | | |
| R1 | −2.598 | d1= | 0.529 | nd1 | 1.5444 | v1 | 56.43 |
| R2 | 9.132 | d2= | 0.751 | | | | |
| R3 | 2.707 | d3= | 0.307 | nd2 | 1.6610 | v2 | 20.53 |
| R4 | 4.557 | d4= | 0.279 | | | | |
| R5 | 3.339 | d5= | 0.405 | nd3 | 1.5444 | v3 | 56.43 |
| R6 | 6.166 | d6= | 0.049 | | | | |
| R7 | 3.457 | d7= | 0.605 | nd4 | 1.5444 | v4 | 56.43 |
| R8 | −1.910 | d8= | 0.173 | | | | |
| R9 | −7.647 | d9= | 0.240 | nd5 | 1.6800 | v5 | 18.40 |
| R10 | 7.025 | d10= | 0.133 | | | | |
| R11 | −5.479 | d11= | 0.566 | nd6 | 1.5444 | v6 | 56.43 |
| R12 | 6.610 | d12= | 0.057 | | | | |
| R13 | 3.194 | d13= | 0.567 | nd7 | 1.5444 | v7 | 56.43 |
| R14 | −1.027 | d14= | 0.043 | | | | |
| R15 | 1.726 | d15= | 0.459 | nd8 | 1.6032 | v8 | 28.29 |
| R16 | 0.679 | d16= | 0.600 | | | | |
| R17 | ∞ | d17= | 0.210 | ndg | 1.5168 | vg | 64.17 |
| R18 | ∞ | d18= | 0.225 | | | | |

Table 5 shows aspherical data of each lens in the camera optical lens 20 according to the Embodiment 2 of the present disclosure.

TABLE 5

| | Conic coefficient | Aspherical coefficient | | | | |
|---|---|---|---|---|---|---|
| | k | A4 | A6 | A8 | A10 | A12 |
| R1 | −2.5000E+01 | 1.0612E−01 | −6.0750E−02 | 2.9945E−02 | −1.1115E−02 | 2.9641E−03 |
| R2 | 1.0000E+01 | 3.1464E−01 | −2.5118E−01 | 2.8470E−01 | −2.3436E−01 | 1.4344E−01 |
| R3 | −1.6010E−01 | 9.9212E−02 | −8.2841E−02 | 6.6513E−01 | −1.7788E+00 | 2.7638E+00 |
| R4 | 1.0000E+01 | 1.4326E−01 | 8.6328E−02 | 1.9084E−01 | −3.4229E−01 | 9.6615E−01 |
| R5 | −3.3327E+00 | 2.7890E−02 | 1.1135E−01 | −3.7553E−01 | 7.4008E−01 | −6.6706E−01 |
| R6 | −1.0000E+01 | −2.6937E−01 | −1.9420E−02 | 9.6076E−02 | −2.5629E−02 | 8.2091E−01 |
| R7 | −1.0000E+01 | −1.7836E−01 | −6.3776E−02 | −1.7144E−01 | 7.0656E−01 | −1.8249E−01 |
| R8 | 8.5735E−01 | −2.9962E−02 | −3.5622E−01 | 1.1420E+00 | −3.0212E+00 | 5.2161E+00 |
| R9 | −1.0000E+01 | −2.8924E−01 | −2.0617E−01 | −2.5360E−01 | 3.9923E−02 | 1.8257E+00 |
| R10 | 5.2206E+00 | −1.8247E−01 | 5.4857E−02 | −1.3060E−03 | −3.7657E−01 | 1.0828E+00 |
| R11 | −1.1847E+00 | −1.4130E−01 | 2.8801E−01 | 1.3781E−01 | −1.5126E+00 | 2.5195E+00 |
| R12 | 1.7590E+00 | −2.6397E−02 | −1.5283E+00 | 3.3713E+00 | −4.1135E+00 | 3.2552E+00 |
| R15 | −1.2281E+00 | −2.0080E−01 | −3.3259E−01 | 7.9186E−01 | −7.9715E−01 | 4.5768E−01 |
| R16 | −3.4938E+00 | −1.9577E−01 | 1.5151E−01 | −8.6276E−02 | 3.3201E−02 | −8.3485E−03 |

| | Conic coefficient | Aspherical coefficient | | | |
|---|---|---|---|---|---|
| | k | A14 | A16 | A18 | A20 |
| R1 | −2.5000E+01 | −5.4908E−04 | 6.6984E−05 | −4.8215E−06 | 1.5488E−07 |
| R2 | 1.0000E+01 | −5.1957E−02 | 7.4815E−03 | 0.0000E+00 | 0.0000E+00 |
| R3 | −1.6010E−01 | −2.2568E+00 | 6.7361E−01 | 0.0000E+00 | 0.0000E+00 |
| R4 | 1.0000E+01 | −1.1566E+00 | 0.0000E+00 | 0.0000E+00 | 0.0000E+00 |
| R5 | −3.3327E+00 | 0.0000E+00 | 0.0000E+00 | 0.0000E+00 | 0.0000E+00 |
| R6 | −1.0000E+01 | −9.4427E−01 | 0.0000E+00 | 0.0000E+00 | 0.0000E+00 |
| R7 | −1.0000E+01 | −2.7664E−01 | 1.0560E−01 | 0.0000E+00 | 0.0000E+00 |
| R8 | 8.5735E−01 | −4.7940E+00 | 1.8353E+00 | 0.0000E+00 | 0.0000E+00 |
| R9 | −1.0000E+01 | −3.0102E+00 | 1.3490E+00 | 0.0000E+00 | 0.0000E+00 |
| R10 | 5.2206E+00 | −1.1105E+00 | 4.9882E−01 | −8.4032E−02 | 0.0000E+00 |
| R11 | −1.1847E+00 | −1.9104E+00 | 7.0492E−01 | −1.0312E−01 | 0.0000E+00 |
| R12 | 1.7590E+00 | −1.6775E+00 | 5.2335E−01 | −8.1942E−02 | 3.7000E−03 |
| R15 | −1.2281E+00 | −1.5934E−01 | 3.3543E−02 | −3.9664E−03 | 2.0416E−04 |
| R16 | −3.4938E+00 | 1.3324E−03 | −1.2782E−04 | 6.4985E−06 | −1.2463E−07 |

Table 6 shows the free-form surface data in the camera optical lens 20 according to the Embodiment 2 of the present disclosure.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | 2.2537E+00 | 3.8065E−01 | 7.6064E−01 | 3.8056E−01 | −1.3455E+00 | −4.0394E+00 | −4.0346E+00 | −1.3463E+00 |
| R14 | −6.9268E−01 | 7.4006E−01 | 1.4790E+00 | 7.4016E−01 | −6.4220E−01 | −1.9279E+00 | −1.9241E+00 | −6.4393E−01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R13 | 2.3475E+00 | 9.3933E+00 | 1.4093E+01 | 9.3858E+00 | 2.3476E+00 | −2.5302E+00 | −1.2651E+01 | −2.5309E+01 |
| R14 | 8.8444E−01 | 3.5389E+00 | 5.3099E+00 | 3.5362E+00 | 8.8549E−01 | −1.2066E+00 | −6.0321E+00 | −1.2068E+01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R13 | −2.5304E+01 | −1.2649E+01 | −2.5299E+00 | 1.6416E+00 | 9.8500E+00 | 2.4625E+01 | 3.2831E+01 | 2.4627E+01 |
| R14 | −1.2067E+01 | −6.0329E+00 | −1.2064E+00 | 1.0108E+00 | 6.0645E+00 | 1.5161E+01 | 2.0214E+01 | 1.5163E+01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R13 | 9.8523E+00 | 1.6418E+00 | −6.2079E−01 | −4.3456E+00 | −1.3036E+01 | −2.1726E+01 | −2.1728E+01 | −1.3038E+01 |
| R14 | 6.0653E+00 | 1.0108E+00 | −5.0495E−01 | −3.5349E+00 | −1.0604E+01 | −1.7673E+01 | −1.7674E+01 | −1.0604E+01 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R13 | −4.3455E+00 | −6.2081E−01 | 1.2102E−01 | 9.6786E−01 | 3.3878E+00 | 6.7757E+00 | 8.4725E+00 | 6.7733E+00 |
| R14 | −3.5347E+00 | −5.0506E−01 | 1.4932E−01 | 1.1945E+00 | 4.1810E+00 | 8.3625E+00 | 1.0452E+01 | 8.3623E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R13 | 3.3869E+00 | 9.6658E−01 | 1.2089E−01 | −7.3415E−03 | −6.6237E−02 | −2.6457E−01 | −6.1847E−01 | −9.2509E−01 |
| R14 | 4.1800E+00 | 1.1943E+00 | 1.4933E−01 | −2.4197E−02 | −2.1776E−01 | −8.7102E−01 | −2.0321E+00 | −3.0487E+00 |

TABLE 6-continued

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R13 | −9.2673E−01 | −6.1731E−01 | −2.6551E−01 | −6.6742E−02 | −7.3633E−03 | −5.4787E−04 | −5.3521E−03 | −2.4382E−02 |
| R14 | −3.0486E+00 | −2.0324E+00 | −8.7175E−01 | −2.1772E−01 | −2.4202E−02 | 1.6586E−03 | 1.6594E−02 | 7.4675E−02 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R13 | −6.4345E−02 | −1.1473E−01 | −1.3615E−01 | −1.1374E−01 | −6.3459E−02 | −2.3872E−02 | −4.7652E−03 | −5.2648E−04 |
| R14 | 1.9891E−01 | 3.4831E−01 | 4.1807E−01 | 3.4826E−01 | 1.9935E−01 | 7.5008E−02 | 1.6632E−02 | 1.6625E−03 |

Figure 4:
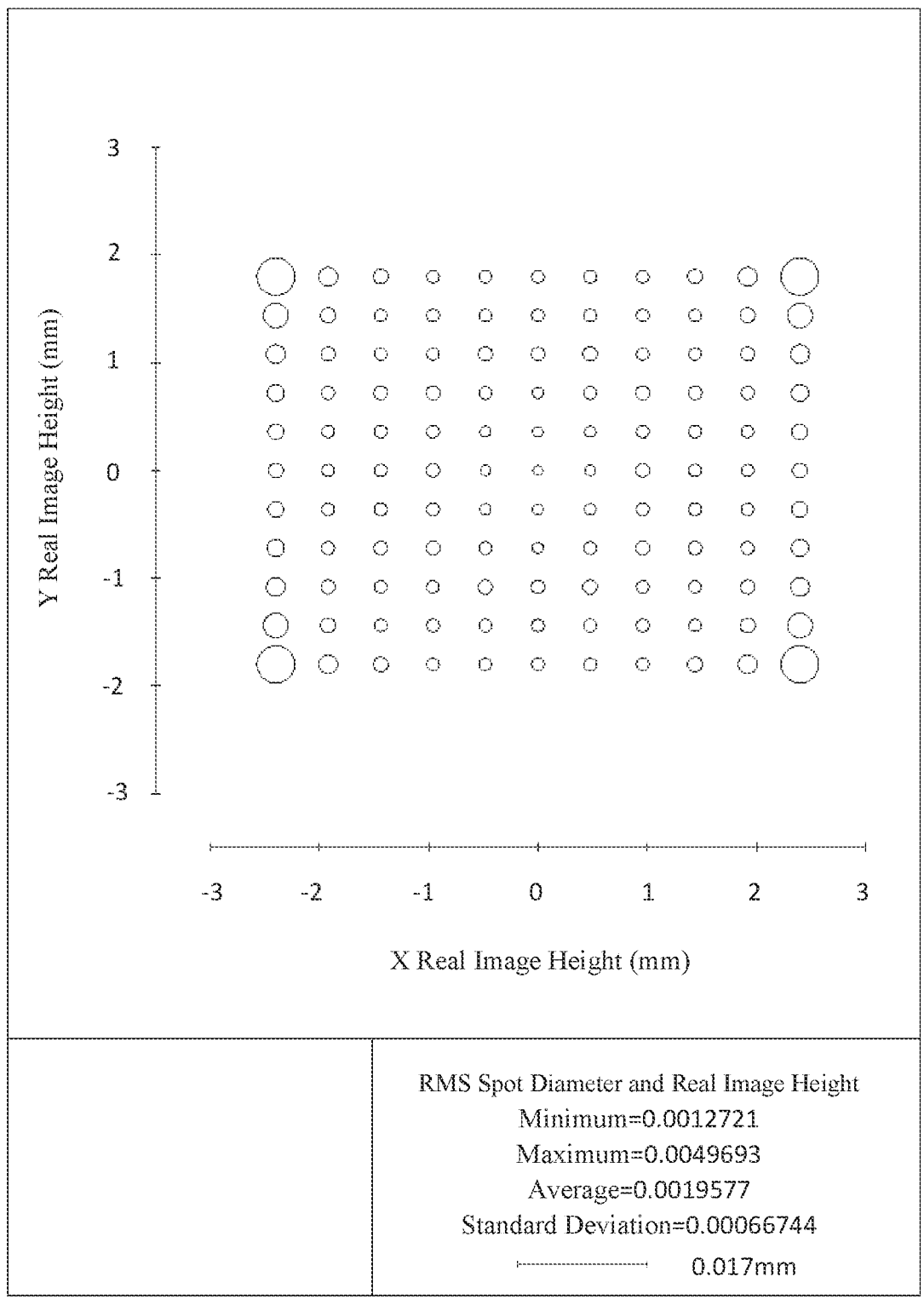
FIG. 4 illustrates a situation where RMS spot diameter of the camera optical lens shown in FIG. 3 is located in a first quadrant.
Figure 5:
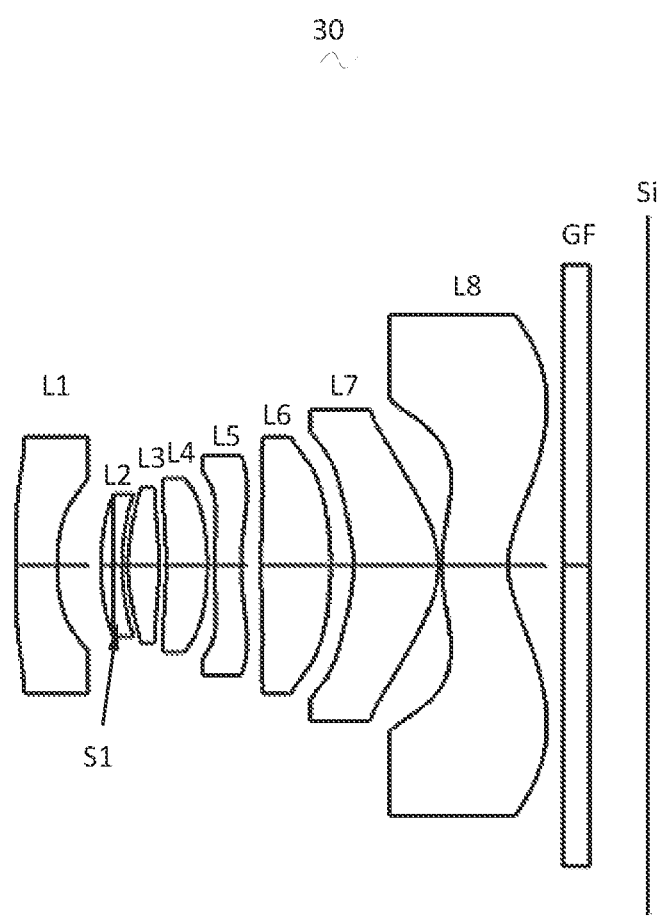
FIG. 5 is a schematic structural diagram of a camera optical lens according to Embodiment 3 of the present disclosure.

FIG. 4 shows a situation where the RMS spot diameter of the camera optical lens 20 according to the Embodiment 2 is within a first quadrant. According to FIG. 4, it can be seen that the camera optical lens 20 according to the Embodiment 2 can achieve good imaging quality.

As shown in Table 13, the Embodiment 2 satisfies respective condition.

As an example, the entrance pupil diameter ENPD of the camera optical lens 20 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 119.99°, the FOV in the x direction is 106.86°, and the FOV in the y direction is 90.50°. The camera optical lens 20 satisfies the design requirements of a wide angle and ultra-thinness, and its on-axis and off-axis color aberration is sufficiently corrected, and the camera optical lens 20 has excellent optical characteristics.

Embodiment 3

The Embodiment 3 is basically the same as the Embodiment 1, and the reference signs in the Embodiment 2 are the same as those in the Embodiment 1, and only a difference thereof will be described in the following.

The second lens L2 has a negative refractive power, the object-side surface of the fifth lens L5 is convex in the paraxial region, the sixth lens L6 has a positive refractive power, the object-side surface of the sixth lens L6 is convex in the paraxial region, the image-side surface of the sixth lens L6 is convex in the paraxial region, the object-side surface of the seventh lens L7 is convex in the paraxial region, and the aperture S1 is located between the first lens L1 and the second lens L2.

Table 7 and Table 8 show design data of the camera optical lens 30 according to the Embodiment 3 of the present disclosure. The object-side surface and the image-side surface of the first lens L1 are free-form surfaces.

TABLE 7

| | R | d | | nd | | vd |
|---|---|---|---|---|---|---|
| S1 | ∞ | d0= | −0.796 | | | |
| R1 | −11.860 | d1= | 0.339 | nd1 | 1.5444 v1 | 55.82 |
| R2 | 2.221 | d2= | 0.359 | | | |
| R3 | 2.415 | d3= | 0.174 | nd2 | 1.5444 v2 | 55.82 |
| R4 | 2.035 | d4= | 0.050 | | | |
| R5 | 2.103 | d5= | 0.251 | nd3 | 1.5444 v3 | 55.82 |
| R6 | −2.813 | d6= | 0.059 | | | |
| R7 | −3.433 | d7= | 0.342 | nd4 | 1.5444 v4 | 55.82 |
| R8 | −2.190 | d8= | 0.052 | | | |
| R9 | 3.394 | d9= | 0.222 | nd5 | 1.6613 v5 | 20.37 |
| R10 | 2.062 | d10= | 0.164 | | | |
| R11 | 7.365 | d11= | 0.569 | nd6 | 1.5444 v6 | 55.82 |
| R12 | −3.161 | d12= | 0.186 | | | |
| R13 | −1.529 | d13= | 0.698 | nd7 | 1.5444 v7 | 55.82 |
| R14 | −0.882 | d14= | 0.032 | | | |
| R15 | 1.731 | d15= | 0.541 | nd8 | 1.6449 v8 | 22.54 |
| R16 | 0.786 | d16= | 0.454 | | | |
| R17 | ∞ | d17= | 0.210 | ndg | 1.5168 vg | 64.17 |
| R18 | ∞ | d18= | 0.481 | | | |

Table 8 shows aspherical data of each lens in the camera optical lens 30 according to the Embodiment 3 of the present disclosure.

TABLE 8

| | Conic coefficient | Aspherical coefficient | | | | |
|---|---|---|---|---|---|---|
| | k | A4 | A6 | A8 | A10 | A12 |
| R3 | 4.8536E+00 | 2.1318E−01 | −8.8093E−01 | 4.3789E+00 | −1.4277E+01 | 3.0087E+01 |
| R4 | −7.8970E−01 | −1.5850E−02 | −1.8617E−02 | 1.1758E−02 | 9.0267E−02 | 1.9048E−01 |
| R5 | −9.7458E−01 | −1.2065E−02 | −8.8603E−03 | −8.8167E−04 | 1.8790E−02 | 1.9619E−02 |
| R6 | −3.6191E+01 | 6.3550E−02 | 2.8648E−01 | −2.7130E−01 | −3.1962E−01 | 6.2446E−01 |
| R7 | −4.3046E+01 | 1.8157E−01 | −5.6187E−02 | −3.5756E−01 | 1.3171E−01 | 4.0040E−01 |
| R8 | 2.7931E−01 | −1.3686E−01 | 5.7723E−01 | −2.8337E+00 | 5.4828E+00 | −5.7820E+00 |
| R9 | −1.7343E+01 | −5.1714E−01 | 1.3167E+00 | −4.4116E+00 | 8.0592E+00 | −1.0371E+01 |
| R10 | −5.6006E−01 | −4.8662E−01 | 1.0022E+00 | −2.2670E+00 | 3.0261E+00 | −2.5045E+00 |
| R11 | −3.4772E+01 | −1.7949E−01 | 3.9377E−01 | −7.4151E−01 | 1.0195E+00 | −9.3349E−01 |
| R12 | 3.4854E+00 | 4.9817E−01 | −6.5218E−01 | 2.6287E+00 | −6.4985E+00 | 9.2368E+00 |
| R13 | 3.7213E−02 | 3.8121E−01 | −6.6118E−01 | 1.6298E+00 | −2.9402E+00 | 2.9004E+00 |
| R14 | −2.4110E+00 | 2.5140E−02 | 6.2480E−02 | −2.8827E−01 | 7.2900E−01 | −9.1828E−01 |
| R15 | −1.2194E+01 | −6.6051E−02 | −3.6110E−01 | 7.8307E−01 | −1.1791E+00 | 1.2203E+00 |
| R16 | −4.3147E+00 | −1.4632E−01 | 9.1534E−02 | −4.8031E−02 | 1.9296E−02 | −5.9531E−03 |

TABLE 8-continued

| | Conic coefficient | Aspherical coefficient | | | |
|---|---|---|---|---|---|
| | k | A14 | A16 | A18 | A20 |
| R3 | 4.8536E+00 | −2.9830E+01 | −1.2283E+00 | −9.0233E+00 | 4.6715E+01 |
| R4 | −7.8970E−01 | 2.7222E−01 | 2.1100E−02 | −9.7007E−01 | −3.2478E+00 |
| R5 | −9.7458E−01 | 3.4994E−02 | 1.0777E−01 | −1.5163E−01 | −2.1855E+00 |
| R6 | −3.6191E+01 | 1.8286E+00 | −2.8068E+00 | 2.1715E+00 | −9.8240E+00 |
| R7 | −4.3046E+01 | −2.5795E−01 | −1.3540E+00 | 2.6435E+00 | −3.6558E+00 |
| R8 | 2.7931E−01 | 1.8607E+00 | 4.3538E−01 | −3.7281E−01 | 2.6832E+00 |
| R9 | −1.7343E+01 | 7.3375E+00 | −1.6850E+00 | 4.8110E−01 | 4.9017E−01 |
| R10 | −5.6006E−01 | 1.1648E+00 | −2.0065E−01 | 1.1934E−02 | 3.1157E−03 |
| R11 | −3.4772E+01 | 4.9522E−01 | −1.0265E−01 | 1.0110E−03 | −2.9769E−03 |
| R12 | 3.4854E+00 | −7.8860E+00 | 4.0865E+00 | −1.1954E+00 | 1.5392E−01 |
| R13 | 3.7213E−02 | −1.5474E+00 | 4.1460E−01 | −4.0067E−02 | −1.9349E−04 |
| R14 | −2.4110E+00 | 5.8931E−01 | −1.8594E−01 | 2.2673E−02 | 1.6715E−04 |
| R15 | −1.2194E+01 | −8.4070E−01 | 3.5526E−01 | −8.1315E−02 | 7.6625E−03 |
| R16 | −4.3147E+00 | 1.3280E−03 | −1.9556E−04 | 1.6716E−05 | −6.1864E−07 |

Table 9 shows free-form surface data in the camera optical lens 30 according to the Embodiment 3 of the present disclosure.

TABLE 9

| | Free-form surface coefficient | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −7.4607E+02 | 2.9550E−01 | 5.9073E−01 | 2.9545E−01 | −3.8163E−01 | −1.1447E+00 | −1.1445E+00 | −3.8162E−01 |
| R2 | −2.6144E+00 | 6.5220E−01 | 1.3025E+00 | 6.5193E−01 | −3.5676E−01 | −1.0762E+00 | −1.0719E+00 | −3.5691E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 3.1238E−01 | 1.2497E+00 | 1.8743E+00 | 1.2500E+00 | 3.1243E−01 | −2.0895E−01 | −1.0447E+00 | −2.0899E+00 |
| R2 | −2.3452E+00 | −9.3791E+00 | −1.4067E+01 | −9.3782E+00 | −2.3449E+00 | 1.9901E+01 | 9.5511E+01 | 1.9905E+02 |

| | $X^4Y^6$ | $X^2Y^8$ | $X^0Y^{10}$ | $X^{12}Y^0$ | $X^{10}Y^2$ | $X^8Y^6$ | $X^6Y^6$ | $X^4Y^8$ |
|---|---|---|---|---|---|---|---|---|
| R1 | −2.0893E+00 | −1.0446E+00 | −2.0890E−01 | 8.4095E−02 | 5.0459E−01 | 1.2610E+00 | 1.6816E+00 | 1.2615E+00 |
| R2 | 1.9903E+02 | 9.9505E+01 | 1.9901E+01 | −7.1184E+01 | −4.2712E+02 | −1.0677E+03 | −1.4236E+03 | −1.0677E+03 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 5.0475E−01 | 8.4133E−02 | −1.9716E−02 | −1.3805E−01 | −4.1476E−01 | −6.9298E−01 | −6.9058E−01 | −4.1409E−01 |
| R2 | −4.2713E+02 | −7.1184E+01 | 1.2640E+02 | 8.8475E+02 | 2.6547E+03 | 4.4239E+03 | 4.4237E+03 | 2.6547E+03 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −1.3831E−01 | −1.9725E−02 | 9.3490E−03 | 7.4701E−02 | 2.6093E−01 | 5.2215E−01 | 6.5111E−01 | 5.2313E−01 |
| R2 | 8.8471E+02 | 1.2640E+02 | −9.7023E+01 | −7.7631E+02 | −2.7162E+03 | −5.4335E+03 | −6.7928E+03 | −5.4344E+03 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 2.6184E−01 | 7.4502E−02 | 9.3089E−03 | −4.4323E−03 | −3.9948E−02 | −1.6009E−01 | −3.7396E−01 | −5.5575E−01 |
| R2 | −2.7165E+03 | −7.7625E+02 | −9.7018E+01 | −5.4054E+00 | −4.8656E+01 | −1.9372E+02 | −4.5470E+02 | −6.8392E+02 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | −5.6096E−01 | −3.7202E−01 | −1.5999E−01 | −4.0399E−02 | −4.4692E−03 | 6.5401E−04 | 6.4589E−03 | 2.9868E−02 |
| R2 | −6.7692E+02 | −4.5279E+02 | −1.9449E+02 | −4.8402E+01 | −5.3978E+00 | 3.5257E+01 | 3.5282E+02 | 1.5881E+03 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 8.1142E−02 | 1.3373E−01 | 1.6029E−01 | 1.3770E−01 | 8.2920E−02 | 2.8982E−02 | 4.8680E−03 | 5.4941E−04 |
| R2 | 4.2202E+03 | 7.3888E+03 | 8.8678E+03 | 7.3928E+03 | 4.2339E+03 | 1.5853E+03 | 3.5372E+02 | 3.5274E+01 |

Figure 6:
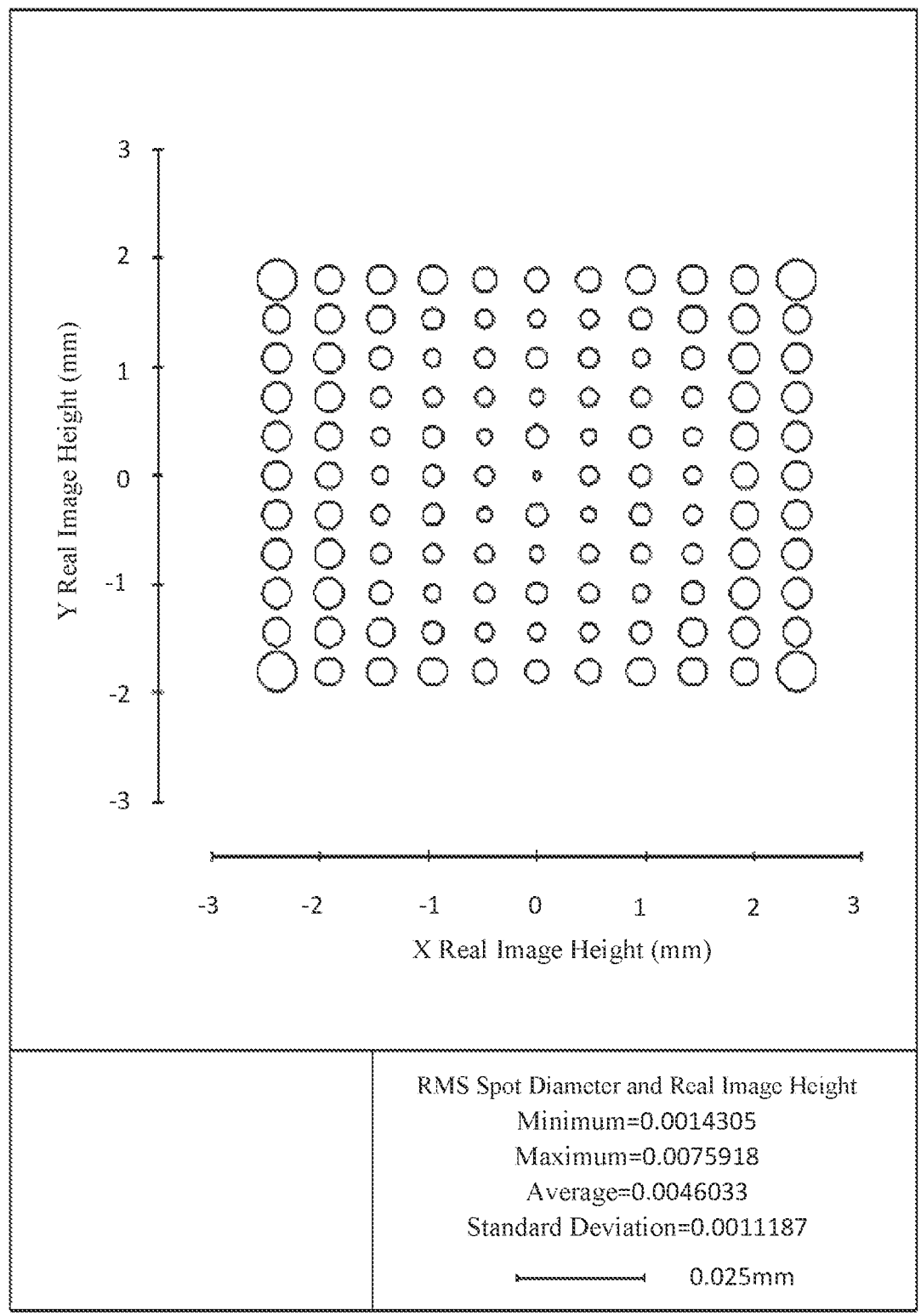
FIG. 6 illustrates a situation where RMS spot diameter of the camera optical lens shown in FIG. 5 is located in a first quadrant.
Figure 7:
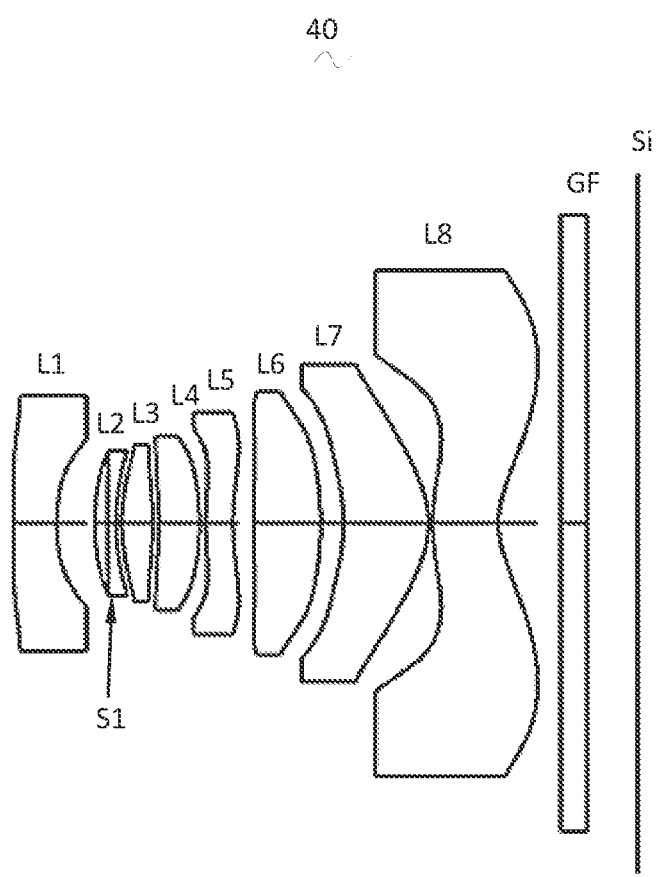
FIG. 7 is a schematic structural diagram of a camera optical lens according to Embodiment 4 of the present disclosure.

FIG. 6 shows a situation where the RMS spot diameter of the camera optical lens 30 according to the Embodiment 3 is located in a first quadrant. According to FIG. 4, it can be seen that the camera optical lens 30 according to the Embodiment 3 can achieve good imaging quality.

The following Table 13 lists the respective numerical value corresponding to each condition according to the above-mentioned condition. Obviously, the imaging optical system according to this embodiment satisfies the above-mentioned condition.

As an example, the entrance pupil diameter ENPD of the camera optical lens 30 is 1.042 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 121.90°, the FOV in the x direction is 98.29°, and the FOV in the y direction is 78.47°. The camera optical lens 30 satisfies the design requirements of a wide angle and ultra-thinness, and its on-axis and off-axis color aberration is sufficiently corrected, and the camera optical lens 20 has excellent optical characteristics.

Embodiment 4

The Embodiment 4 is basically the same as the Embodiment 1, and the reference signs in the Embodiment 4 are the same as those in the Embodiment 1, and only a difference thereof will be described in the following.

The second lens L2 has a negative refractive power, the object-side surface of the fifth lens L5 is convex in the paraxial region, the sixth lens L6 has a positive refractive power, the object-side surface of the sixth lens L6 is convex in the paraxial region, the image-side surface of the sixth lens L6 is convex in the paraxial region, the object-side surface of the seventh lens L7 is concave in the paraxial region, and the aperture S1 is located between the first lens L1 and the second lens L2.

Table 10 and Table 11 show design data of the camera optical lens 40 according to the Embodiment 4 of the present disclosure. Herein, the object-side surface and the image-side surface of the second lens L2 are free-form surfaces.

TABLE 10

|  | R | d |  | nd |  | vd |
|---|---|---|---|---|---|---|
| S1 | ∞ | d0= | −0.772 |  |  |  |
| R1 | −12.917 | d1= | 0.361 | nd1 | 1.5444 v1 | 55.82 |
| R2 | 2.176 | d2= | 0.308 |  |  |  |
| R3 | 2.308 | d3= | 0.173 | nd2 | 1.5444 v2 | 55.82 |
| R4 | 1.968 | d4= | 0.050 |  |  |  |
| R5 | 2.030 | d5= | 0.250 | nd3 | 1.5444 v3 | 55.82 |
| R6 | −2.893 | d6= | 0.049 |  |  |  |
| R7 | −3.602 | d7= | 0.335 | nd4 | 1.5444 v4 | 55.82 |
| R8 | −2.254 | d8= | 0.050 |  |  |  |
| R9 | 3.372 | d9= | 0.220 | nd5 | 1.6613 v5 | 20.37 |
| R10 | 2.044 | d10= | 0.169 |  |  |  |
| R11 | 7.101 | d11= | 0.547 | nd6 | 1.5444 v6 | 55.82 |
| R12 | −3.175 | d12= | 0.188 |  |  |  |
| R13 | −1.528 | d13= | 0.691 | nd7 | 1.5444 v7 | 55.82 |
| R14 | −0.878 | d14= | 0.035 |  |  |  |
| R15 | 1.723 | d15= | 0.538 | nd8 | 1.6449 v8 | 22.54 |
| R16 | 0.780 | d16= | 0.509 |  |  |  |
| R17 | ∞ | d17= | 0.210 | ndg | 1.5168 vg | 64.17 |
| R18 | ∞ | d18= | 0.421 |  |  |  |

Table 11 shows aspherical data of each lens in the camera optical lens 40 according to the Embodiment 4 of the present disclosure.

TABLE 11

|  | Conic coefficient | Aspherical coefficient | | | | |
|---|---|---|---|---|---|---|
|  | k | A4 | A6 | A8 | A10 | A12 |
| R1 | −3.7512E+02 | 2.9030E−01 | −3.8089E−01 | 3.0985E−01 | −2.0615E−01 | 8.4214E−02 |
| R2 | −1.9063E+00 | 6.5590E−01 | −3.3023E−01 | −2.3397E+00 | 1.9735E+01 | −7.0588E+01 |
| R5 | −1.1363E+00 | −1.5158E−02 | −2.0336E−02 | −1.6798E−02 | −3.6884E−03 | −9.2063E−03 |
| R6 | −3.4691E+01 | 6.1534E−02 | 2.8467E−01 | −3.1322E−01 | −3.8686E−01 | 6.0728E−01 |
| R7 | −3.9142E+01 | 1.8609E−01 | −5.9143E−02 | −3.7957E−01 | 1.3956E−01 | 4.5627E−01 |
| R8 | 1.0443E−01 | −1.3700E−01 | 6.1357E−01 | −2.9873E+00 | 5.8991E+00 | −6.2843E+00 |
| R9 | −1.3900E+01 | −5.2771E−01 | 1.3686E+00 | −4.6621E+00 | 8.6592E+00 | −1.1329E+01 |
| R10 | −5.2436E−01 | −4.9837E−01 | 1.0400E+00 | −2.3956E+00 | 3.2538E+00 | −2.7327E+00 |
| R11 | −8.1390E+01 | −1.8912E−01 | 4.0883E−01 | −7.8334E−01 | 1.0961E+00 | −1.0184E+00 |
| R12 | 3.3723E+00 | 5.0523E−02 | −6.7507E−01 | 2.7803E+00 | −6.9818E+00 | 1.0083E+01 |
| R13 | −1.2851E−02 | 3.9568E−01 | −6.8610E−01 | 1.7239E+00 | −3.1587E+00 | 3.1662E+00 |
| R14 | −2.3981E+00 | 2.5553E−01 | 6.3667E−01 | −3.0532E−01 | 7.8299E−01 | −1.0025E+00 |
| R15 | −1.1977E+01 | −7.1471E−02 | −3.7478E−01 | 8.2843E−01 | −1.2666E+00 | 1.3321E+00 |
| R16 | −4.1917E+00 | −1.5016E−01 | 9.5241E−02 | −5.0791E−02 | 2.0728E−02 | −6.4990E−03 |

|  | Conic coefficient | Aspherical coefficient | | | |
|---|---|---|---|---|---|
|  | k | A14 | A16 | A18 | A20 |
| R1 | −3.7512E+02 | −1.9393E−02 | 9.0753E−03 | −4.5889E−03 | 6.4254E−04 |
| R2 | −1.9063E+00 | 1.2545E+02 | −9.6265E+01 | −5.4391E+00 | 3.4895E+01 |
| R5 | −1.1363E+00 | −9.6198E−03 | −2.7075E−02 | −9.1553E−01 | −5.8448E+00 |
| R6 | −3.4691E+01 | 1.9446E+00 | −3.2321E+00 | 2.8933E+00 | −9.0944E+00 |
| R7 | −3.9142E+01 | −1.9911E−01 | −1.2749E+00 | 3.4705E+00 | −4.3426E+00 |
| R8 | 1.0443E−01 | 2.1077E+00 | 5.2931E+00 | −4.7160E−01 | 2.8289E+00 |
| R9 | −1.3900E+01 | 8.1176E+00 | −1.9444E+00 | 4.7167E−01 | 4.1541E−01 |
| R10 | −5.2436E−01 | 1.2910E+00 | −2.2858E−01 | 1.0608E−02 | 8.7990E−04 |
| R11 | −8.1390E+01 | 5.4979E−01 | −1.1526E−01 | 1.4419E−03 | −3.3421E−03 |
| R12 | 3.3723E+00 | −8.7468E+00 | 4.6054E+00 | −1.3687E+00 | 1.7917E−01 |
| R13 | −1.2851E−02 | −1.7162E+00 | 4.6716E−01 | −4.6016E−02 | −5.7516E−04 |
| R14 | −2.3981E+00 | 6.5359E−01 | −2.0955E−01 | 2.5955E−02 | 1.9808E−04 |
| R15 | −1.1977E+01 | −9.3247E−01 | 4.0036E−01 | −9.3117E−02 | 8.9123E−03 |
| R16 | −4.1917E+00 | 1.4728E−03 | −2.2038E−04 | 1.9146E−05 | −7.1779E−07 |

Table 12 shows free-form surface data in the camera optical lens 40 according to the Embodiment 4 of the present disclosure.

TABLE 12

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| R3 | 4.7185E+00 | 2.1980E−01 | 4.3797E−01 | 2.1986E−01 | −9.3451E−01 | −2.8093E+00 | −2.8077E+00 | −9.3301E−01 |
| R4 | −2.2997E+00 | −3.7764E−02 | −7.6944E−02 | −3.7545E−02 | −1.6098E−02 | −8.2244E−02 | −6.0061E−02 | −1.5232E−02 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R3 | 4.6038E+00 | 1.8382E+01 | 2.7562E+01 | 1.8400E+01 | 4.6042E+00 | −1.5322E+01 | −7.6717E+01 | −1.5319E+02 |
| R4 | 3.4932E−02 | 1.3155E−01 | 2.5267E−01 | 1.2246E−01 | 3.5353E−02 | 1.1213E−01 | 6.7347E−01 | 1.3495E+00 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R3 | −1.5343E+02 | −7.6645E+01 | −1.5323E+01 | 3.3005E+01 | 1.9801E+02 | 4.9562E+02 | 6.6059E+02 | 4.9564E+02 |
| R4 | 1.2269E+00 | 5.2057E−01 | 1.1254E−01 | 1.3985E−01 | 8.7027E−01 | 2.9376E+00 | 3.2952E+00 | 2.5233E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R3 | 1.9804E+02 | 3.2996E+01 | −3.2648E+01 | −2.2845E+02 | −6.8182E+02 | −1.1383E+03 | −1.1392E+03 | −6.8369E+02 |
| R4 | 8.8374E−01 | 1.4779E−01 | 1.0415E−02 | 3.4918E−02 | 4.6325E+00 | 1.4286E−01 | 1.3343E−01 | 2.2273E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R3 | −2.2859E+02 | −3.2665E+01 | −7.7537E−01 | −6.8986E+00 | −2.1005E+01 | −4.3637E+01 | −5.7066E+01 | −4.5209E+01 |
| R4 | 6.8689E−02 | −3.1469E−03 | −7.3724E−01 | −6.1069E+00 | −2.1408E+01 | −3.8504E+01 | −4.9062E+01 | −3.9021E+01 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R3 | −2.2881E+01 | −6.0276E+00 | −8.1079E−01 | −1.0820E+01 | −1.0055E+02 | −3.7250E+02 | −8.7515E+02 | −1.3381E+03 |
| R4 | −1.6923E+01 | −5.7798E+00 | −7.4708E−01 | −2.2548E+00 | −2.4020E+01 | −5.2989E+01 | −1.6789E+02 | −2.6513E+02 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R3 | −1.3376E+03 | −9.2230E+02 | −3.6650E+02 | −9.6789E+01 | −1.0907E+01 | 4.7016E+01 | 4.6572E+02 | 2.2078E+03 |
| R4 | −2.7489E+02 | −1.2638E+02 | −7.6659E+01 | −2.0591E+01 | −2.2285E+00 | −2.6362E+00 | −4.3222E+01 | −6.9534E+01 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R3 | 5.8869E+03 | 1.0137E+04 | 1.2046E+04 | 1.0043E+04 | 5.7274E+03 | 2.1045E+03 | 4.7372E+02 | 4.6810E+01 |
| R4 | −3.3188E+02 | −5.9555E+02 | −7.3522E+02 | −7.1446E+02 | −1.9690E+02 | −1.5119E+01 | −3.5131E+01 | −3.3448E+00 |

Figure 8:
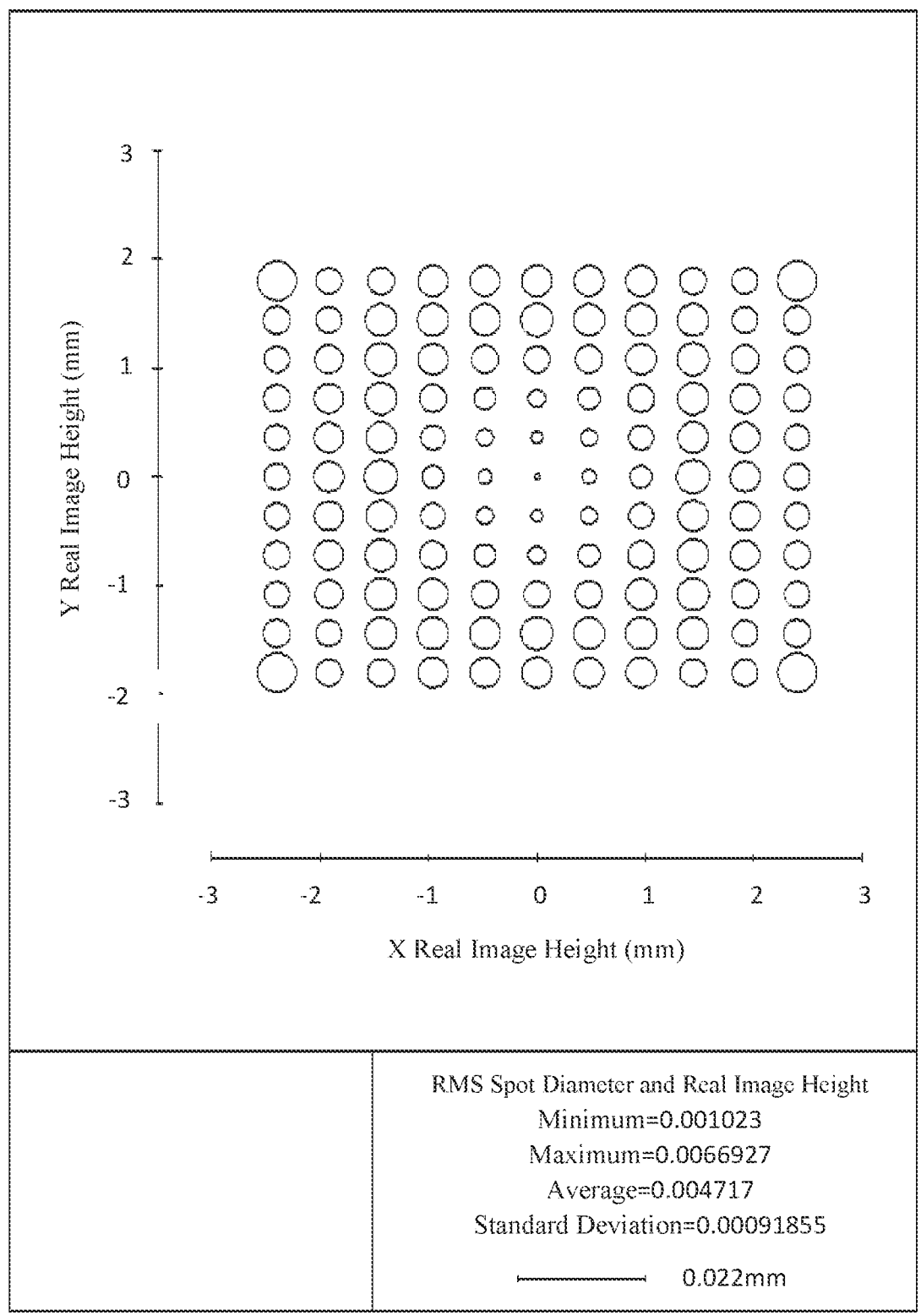
FIG. 8 illustrates a situation where RMS spot diameter of the camera optical lens shown in FIG. 7 is located in a first quadrant.

FIG. 8 shows a situation where the RMS spot diameter of the camera optical lens 40 according to the Embodiment 4 is located in a first quadrant. According to FIG. 8, it can be seen that the camera optical lens 40 according to the Embodiment 4 can achieve good imaging quality.

The following Table 13 lists the respective numerical value corresponding to each condition according to the above-mentioned condition. Obviously, the imaging optical system according to this embodiment satisfies the above-mentioned condition.

As an example, the entrance pupil diameter ENPD of the camera optical lens 30 is 1.054 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 122.35°, the FOV in the x direction is 98.71°, and the FOV in the y direction is 78.16°. The camera optical lens 40 satisfies the design requirements of a wide angle and ultra-thinness, and its on-axis and off-axis color aberration is sufficiently corrected, and the camera optical lens 20 has excellent optical characteristics.

TABLE 13

| Parameters and condition expression | Embodiment 1 | Embodiment 2 | Embodiment 3 | Embodiment 4 |
|---|---|---|---|---|
| f2/f6 | −2.07 | −1.74 | −6.85 | −7.31 |
| R1/R2 | −0.19 | −0.28 | −5.34 | −5.94 |
| f | 1.800 | 1.800 | 2.084 | 2.107 |
| f1 | −3.724 | −3.646 | −3.393 | −3.378 |
| f2 | 9.754 | 9.377 | −28.259 | −29.895 |
| f3 | 4.099 | 12.688 | 2.241 | 2.222 |
| f4 | 3.166 | 2.346 | 10.081 | 10.131 |
| f5 | −5.188 | −5.297 | −8.413 | −8.310 |
| f6 | −4.705 | −5.396 | 4.124 | 4.090 |
| f7 | 1.484 | 1.494 | 2.758 | 2.743 |
| f8 | −2.221 | −2.210 | −2.854 | −2.820 |
| FNO | 1.80 | 1.80 | 2.00 | 2.00 |
| TTL | 6.164 | 6.198 | 5.183 | 5.104 |
| FOV | 119.99° | 119.99° | 121.90° | 122.35° |
| IH | 6.000 | 6.000 | 6.000 | 6.000 |

It should be understood by those skilled in the art that the above embodiments are merely some specific embodiments of the present disclosure, and various changes in form and details may be made without departing from the scope of the present disclosure.

What is claimed is:

1. A camera optical lens, comprising, from an object side to an image side, a first lens, a second lens, a third lens, a fourth lens, a fifth lens, a sixth lens, a seventh lens, and an eighth lens, wherein at least one of the first lens, the second lens, the third lens, the fourth lens, the fifth lens, the sixth lens, the seventh lens, or the eighth lens has a free-form surface, and wherein the third lens has a positive refractive power wherein the camera optical lens satisfies:

$-7.50 \le f2/f6 \le -1.50$;

$-6.00 \le R1/R2 \le -0.18$, $-4.14 \le f1/f \le -1.07$;

$-1.36 \le (R1+R2)/(R1-R2) \le 1.07$;

$11.71 \le (R3+R4)/(R3-R4) \le 18.86$, and $0.03 \le d1/TTL \le 0.14$, where f denotes a focal length of the camera optical lens, f1 denotes a focal length of the first lens, f2 denotes a focal length of the second lens, f6 denotes a focal length of the sixth lens, R1 denotes a curvature radius of an object-side surface of the first lens, R2 denotes a curvature radius of an image-side surface of the first lens, R3 denotes a curvature radius of an object-side surface of the second lens, R4 denotes a curvature radius of an image-side surface of the second lens. d1 denotes an on-axis thickness of the first lens, and TTL denotes a total optical length from the object-side surface of the first lens to an image plane of the camera optical lens along an optic axis.

2. The camera optical lens as described in claim 1, further satisfying:

$4.00 \le d5/d6 \le 9.00$, where d5 denotes an on-axis thickness of the third lens, and d6 denotes an on-axis distance from an image-side surface of the third lens to an object-side surface of the fourth lens.

3. The camera optical lens as described in claim 1, further satisfying:

$-28.38 \le f2/f \le 8.13$; and $0.02 \le d3/TTL \le 0.07$, where d3 denotes an on-axis thickness of the second lens.

4. The camera optical lens as described in claim 1, further satisfying:

$0.53 \le f3/f \le 10.57$;

$-6.72 \le (R5+R6)/(R5-R6) \le -0.10$; and $0.02 \le d5/TTL \le 0.12$, where f3 denotes a focal length of the third lens, R5 denotes a curvature radius of an object-side surface of the third lens, R6 denotes a curvature radius of an image-side surface of the third lens, d5 denotes an on-axis thickness of the third lens.

5. The camera optical lens as described in claim 1, further satisfying:

$0.65 \le f4/f \le 7.26$;

$0.14 \le (R7+R8)/(R7-R8) \le 6.79$; and $0.03 \le d7/TTL \le 0.15$, where f4 denotes a focal length of the fourth lens, R7 denotes a curvature radius of an object-side surface of the fourth lens, R8 denotes a curvature radius of an image-side surface of the fourth lens, d7 denotes an on-axis thickness of the fourth lens.

6. The camera optical lens as described in claim 1, further satisfying:

$-8.07 \le f5/f \le -1.92$;

$0.02 \le (R9+R10)/(R9-R10) \le 6.14$; and $0.02 \le d9/TTL \le 0.06$, where f5 denotes a focal length of the fifth lens, R9 denotes a curvature radius of an object-side surface of the fifth lens, R10 denotes a curvature radius of an image-side surface of the fifth lens, d9 denotes an on-axis thickness of the fifth lens.

7. The camera optical lens as described in claim 1, further satisfying:

$6.00 \le f6/f \le 2.97$;

$-1.17 \le (R11+R12)/(R11-R12) \le 0.60$; and $0.05 \le d11/TTL \le 0.16$, where R11 denotes a curvature radius of an object-side surface of the sixth lens, R12 denotes a curvature radius of an image-side surface of the sixth lens, d11 denotes an on-axis thickness of the sixth lens.

8. The camera optical lens as described in claim 1, further satisfying:

$0.41 \le f7/f \le 1.99$;

$0.26 \le (R13+R14)/(R13-R14) \le 5.59$; and $0.04 \le d13/TTL \le 0.20$, where f7 denotes a focal length of the seventh lens, R13 denotes a curvature radius of an object-side surface of the seventh lens, R14 denotes a curvature radius of an image-side surface of the seventh lens, d13 denotes an on-axis thickness of the seventh lens.

9. The camera optical lens as described in claim 1, further satisfying:

$-2.74 \le f8/f \le -0.82$;

$1.15 \le (R15+R16)/(R15-R16) \le 4.00$; and $0.03 \le d15/TTL \le 0.16$, where f8 denotes a focal length of the eighth lens, R15 denotes a curvature radius of an object-side surface of the eighth lens, R16 denotes a curvature radius of an image-side surface of the eighth lens, d15 denotes an on-axis thickness of the eighth lens.

* * * * *